(12) United States Patent
Lee et al.

(10) Patent No.: US 8,730,853 B2
(45) Date of Patent: May 20, 2014

(54) METHODS FOR RESPONDING TO CO-LOCATED COEXISTENCE (CLC) REQUEST FROM A MOBILE ELECTRONIC DEVICE AND COMMUNICATIONS APPARATUSES CAPABLE OF CONTROLLING MULTI-RADIO COEXISTENCE

(75) Inventors: Chi-Chen Lee, Taipei (TW); I-Kang Fu, Kaochsiung County (TW); Li-Chun Ko, Taipei (TW); Hong-Kai Hsu, Taipei County (TW); Chih-Hao Yeh, Taipei County (TW); Jiun-Jang Su, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 755 days.

(21) Appl. No.: 12/552,427

(22) Filed: Sep. 2, 2009

(65) Prior Publication Data

US 2010/0061326 A1    Mar. 11, 2010

Related U.S. Application Data

(60) Provisional application No. 61/094,542, filed on Sep. 5, 2008.

(51) Int. Cl.
*H04B 7/00* (2006.01)
*H04W 4/00* (2009.01)

(52) U.S. Cl.
USPC ............................ 370/310; 370/329; 370/338

(58) Field of Classification Search
USPC ......................... 370/310, 331–338
See application file for complete search history.

(56) References Cited

U.S. PATENT DOCUMENTS

| 7,929,468 B2 | 4/2011 | Goldhamer |
| 8,059,622 B2 | 11/2011 | Zhu |

(Continued)

FOREIGN PATENT DOCUMENTS

| CN | 1947348 A | 4/2007 |
| CN | 101132215 A | 2/2008 |

(Continued)

OTHER PUBLICATIONS

"Part 16: Air Interface for Fixed and Mobile Broadband Wireless Access Systems: Amendment 2: Physical and Medium Access Control Layers for Combined Fixed and Mobile Operation in Licensed Bands and Corrigendum 1" IEEE Standard for Local and Metropolitan Area Networks; IEEE Computer Society and the IEEE Microwave Theory and Techniques Society; IEEE Std 802.16e-2005 and IEEE Std 802.16-2004/Cor1-2005; Feb. 28, 2006.

(Continued)

*Primary Examiner* — Brandon Renner
(74) *Attorney, Agent, or Firm* — McClure, Qualey & Rodack,LLP

(57) ABSTRACT

A communications apparatus is provided. A first radio module provides a first wireless communications service and communicates with a first communications device in compliance with a first protocol. A second radio module provides a second wireless communications service and communicates with a second communications device in compliance with a second protocol. A Co-Located Coexistence radio manager detects activities of the first radio modules, obtains a first traffic pattern describing downlink and/or uplink traffic allocations of the first radio module from the first radio module, and generates a second traffic pattern of the second radio module according to the first traffic pattern to coordinate operations of the first and second radio modules. The second traffic pattern describes recommended downlink and/or uplink traffic allocations to a plurality of sub-frames for the second radio module, and each sub-frame defined by the second protocol includes Orthogonal Frequency Division Multiplexing symbols.

30 Claims, 26 Drawing Sheets

(56) References Cited

U.S. PATENT DOCUMENTS

| | | | |
|---|---|---|---|
| 8,107,413 B2 | 1/2012 | Lee et al. | |
| 2002/0142779 A1 | 10/2002 | Goto et al. | |
| 2004/0170134 A1* | 9/2004 | Furuyama et al. | 370/310 |
| 2006/0031924 A1 | 2/2006 | Kwon et al. | |
| 2006/0126490 A1* | 6/2006 | Hagen et al. | 370/208 |
| 2007/0086474 A1* | 4/2007 | Lee et al. | 370/447 |
| 2007/0099653 A1* | 5/2007 | Parron et al. | 455/552.1 |
| 2007/0140377 A1* | 6/2007 | Murakami et al. | 375/299 |
| 2007/0275746 A1 | 11/2007 | Bitran | |
| 2008/0004002 A1* | 1/2008 | Chin et al. | 455/425 |
| 2009/0003257 A1* | 1/2009 | Kumar et al. | 370/314 |
| 2009/0088199 A1* | 4/2009 | Nurminen et al. | 455/552.1 |
| 2009/0141692 A1* | 6/2009 | Kasslin et al. | 370/338 |
| 2009/0213804 A1 | 8/2009 | Yoon et al. | |
| 2009/0219904 A1 | 9/2009 | Khairmode et al. | |
| 2009/0252128 A1* | 10/2009 | Yang et al. | 370/338 |
| 2009/0257379 A1 | 10/2009 | Robinson et al. | |
| 2010/0056136 A1* | 3/2010 | Zhu | 455/426.1 |
| 2010/0135256 A1 | 6/2010 | Lee et al. | |

FOREIGN PATENT DOCUMENTS

| | | |
|---|---|---|
| CN | 101253735 | 8/2008 |
| CN | 101621324 | 1/2010 |
| CN | 101646245 | 2/2010 |
| EP | 1734698 A1 | 12/2006 |
| JP | 1997512409 | 12/1997 |
| JP | 2004320153 A | 11/2004 |
| WO | 2007008981 | 1/2007 |
| WO | WO 2007070409 | 6/2007 |
| WO | 2008056804 | 5/2008 |
| WO | 2008078311 | 7/2008 |

OTHER PUBLICATIONS

International Search Report dated Dec. 30, 2010.

English language translation of abstract of CN 101621324 (published Jan. 6, 2010).

English language translation of abstract of CN 101646245 (published Feb. 10, 2010).

English language translation of abstract of JPA1997512409 (published Dec. 9, 1997).

English language translation of abstract of CN 101253735 (published Aug. 27, 2008).

Chiasserini, C., et al.; "Coexistence Mechanisms for Interference Mitigation in the 2.4-GHz ISM Band;" IEEE Transactions on Wireless Communications; vol. 2; No. 5; Sep. 1, 2003; pp. 964-975.

* cited by examiner

METHODS FOR RESPONDING TO CO-LOCATED COEXISTENCE (CLC) REQUEST FROM A MOBILE ELECTRONIC DEVICE AND COMMUNICATIONS APPARATUSES CAPABLE OF CONTROLLING MULTI-RADIO COEXISTENCE

CROSS REFERENCE TO RELATED APPLICATIONS

This application claims the benefit of U.S. Provisional Application No. 61/094,542 filed Sep. 5, 2008 and entitled "MULTI-RADIO COEXISTENCE CONTROL MECHANISM FOR WIRELESS COMMUNICATION SYSTEMS". The entire contents of which are hereby incorporated by reference.

BACKGROUND OF THE INVENTION

1. Field of the Invention

The invention relates to a method for coordinating the operations of a plurality of wireless communications services in a communications apparatus, and more particularly to a method for coordinating the operations of a plurality of wireless communications services in a communications apparatus to avoid signal interference.

2. Description of the Related Art

With the development of wireless communications technology, mobile electronic devices may be provided with more than one wireless communications service, such as Bluetooth, Wireless Fidelity (WiFi), Worldwide Interoperability for Microwave Access (WiMAX) wireless communications service, and so on. In this regard, the overlapping or adjacent operating frequency band among the different wireless communications services causes transmission performances thereof to degrade. Table 1 below shows the operating frequency band for a WiMAX, WiFi and Bluetooth wireless communications service.

TABLE 1

Category of Wireless Communications Services

| Usage | Wireless Communications service | Frequency band |
|---|---|---|
| Wide Area Network (WAN) | WiMAX | 2.300-2.400 GHz |
| | | 2.496-2.690 GHz |
| | | 3.300-3.800 GHz |
| Local Area Network (LAN) | WiFi | 2.412-2.4835 GHz |
| | | 4.9-5.9 GHz |
| Personal Area Network (PAN) | Bluetooth | 2.402-2.480 GHz |

As shown in Table 1, the frequency bands of WiFi and Bluetooth overlap with each other. In addition, the frequency bands of WiFi and Bluetooth are adjacent to the frequency bands of the WiMAX. When these wireless communications services are integrated in a mobile electronic devices, simultaneous transmission and reception by different wireless communications services cause transmission interference.

Therefore, a method for coordinating the operations of a plurality of wireless communications services in a communications apparatus is highly required.

BRIEF SUMMARY OF THE INVENTION

Communications apparatuses and methods for responding to Co-located Coexistence (CLC) request from a mobile electronic device are provided. An embodiment of a communications apparatus comprises: a first radio module, a second radio module and a Co-Located Coexistence (CLC) radio manager. The first radio module provides a first wireless communications service and communicates with a first communications device in compliance with a first protocol. The second radio module provides a second wireless communications service and communicates with a second communications device in compliance with a second protocol. The CLC radio manager detects activities of the first radio modules, obtains a first traffic pattern describing downlink and/or uplink traffic allocations of the first radio module from the first radio module, and generates a second traffic pattern of the second radio module according to the first traffic pattern to coordinate operations of the first and second radio modules. The second traffic pattern describes recommended downlink and/or uplink traffic allocations to a plurality of sub-frames for the second radio module, and each sub-frame defined by the second protocol comprises a plurality of Orthogonal Frequency Division Multiplexing (OFDM) symbols.

Another embodiment of a communications apparatus comprises a first radio module and a second radio module. The first radio module provides a first wireless communications service and communicates with a first communications device in compliance with a first protocol. The second radio module provides a second wireless communications service and communicates with a second communications device in compliance with a second protocol, enters a learning phase, and transmits a first request message to the second communications device to request for a period of absence to support an initial setup or connection setup operation of the first radio module.

Another embodiment of a method for responding to a Co-located Coexistence (CLC) request from a mobile electronic device comprising a first radio module and a second radio module, performed by a base station, comprises: receiving a CLC request from the mobile electronic device, which requests for a period of absence of traffics to the second radio module to prevent interference with an operation of the first radio module; and enhancing transmission reliability when transmitting data to the second radio module in the requested period.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

Table 1 lists the category of Wireless Communications Services;

Table 2 lists time Unit of CLC Class Parameters;

Table 3 lists the CLC_Request message parameters; and

Table 4 lists the parameters of CLC Information parameters applicable to the CLC_Request message.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
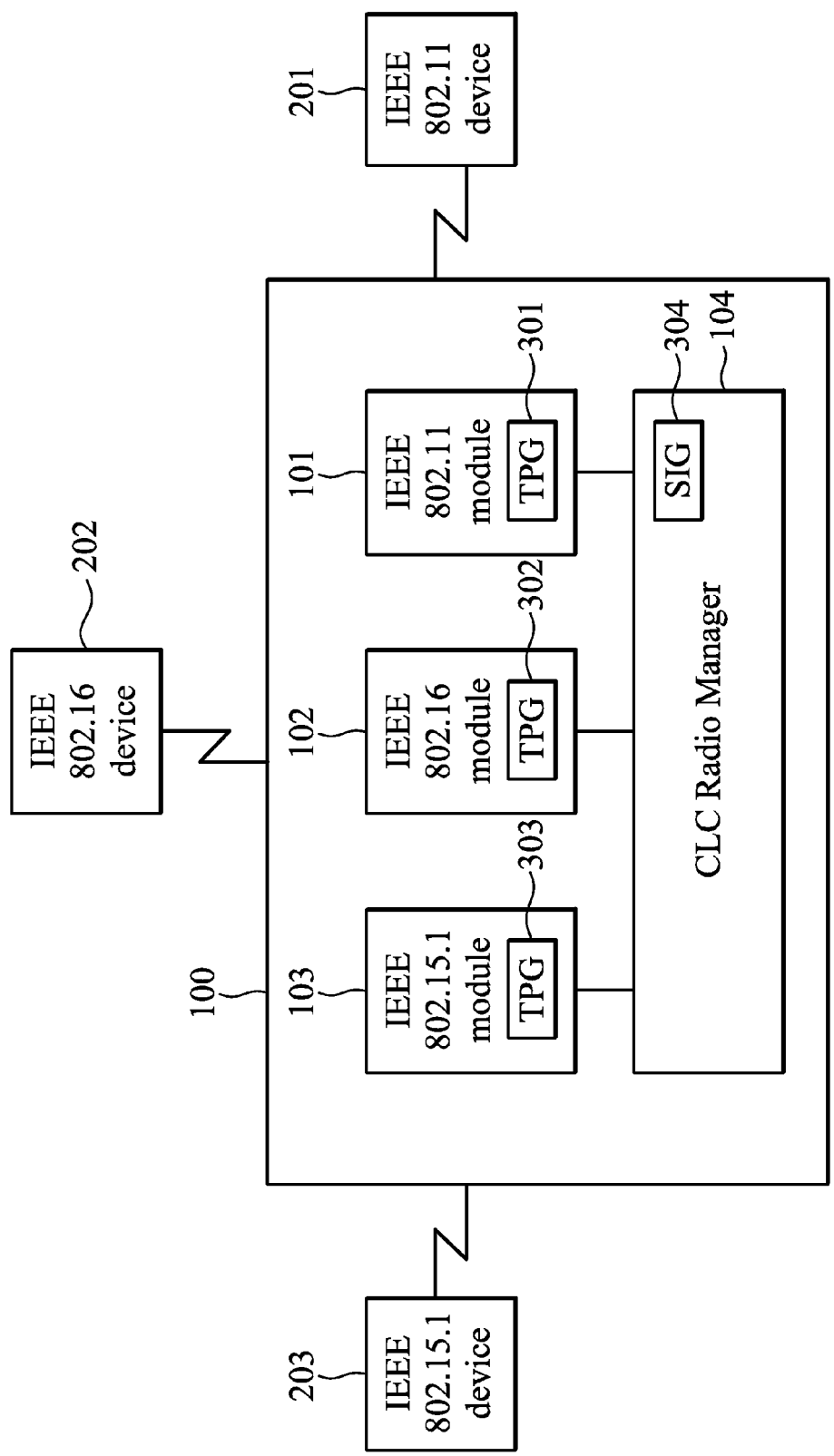
FIG. 1 is a schematic diagram showing a multi-radio communications system according to an embodiment of the invention.

Along with the advancements in wireless communications technology, radio modules providing different wireless communications services may be co-located and coexist in a mobile electronic device. FIG. 1 shows a schematic diagram of a multi-radio communications system according to an embodiment of the invention. The mobile electronic device 100 may be a notebook, a cellular phone, a portable gaming device, a portable multimedia player, a Global Positioning System (GPS), a receiver, or others. The mobile electronic device 100 may comprise a plurality of radio modules providing different wireless communications services. As an example, the mobile electronic device 100 may comprise an IEEE 802.11 radio module 101, an IEEE 802.16 radio module 102, an IEEE 802.15.1 radio module 103, and a Co-located Coexistence (CLC) Radio Manager 104. The IEEE 802.11 radio module 101 may communicate with an IEEE 802.11 device 201 in compliance with the IEEE 802.11 protocol via the air interface. The IEEE 802.11 device 201 may be, as an example, an IEEE 802.11 Base Station (BS), Access Point (AP) or Station (STA). The IEEE 802.11 module 101 may be an IEEE 802.11 Base Station (BS), Access Point (AP) or Station (STA) being operated as a router to enable the IEEE 802.11 device 201 to connect to Internet through the IEEE 802.16 device 202. The IEEE 802.16 radio module 102 may communicate with an IEEE 802.16 device 202 in compliance with the IEEE 802.16 protocol via the air interface. The IEEE 802.16 device 202 may be, as an example, an IEEE 802.16 Base Station (BS) or Relay Station (RS). The IEEE 802.15.1 radio module 103 may communicate with an IEEE 802.15.1 device 203 in compliance with IEEE 802.15.1 protocol via the air interface. The IEEE 802.15.1 device 203 may be, as an example, a Bluetooth handset. The CLC Radio Manager 104 provides interfaces between the IEEE 802.16 radio module 102 and CLC radio modules and detects activities of the IEEE 802.16 radio module 102 and CLC radio modules so as to coordinate the operations therebetween. The CLC radio modules are the radio modules that are co-located and coexist in the mobile electronic device 100 with the IEEE 802.16 radio module and may cause interference to the IEEE 802.16 radio module when transmitting and receiving radio signals, such as the IEEE 802.11 radio module 101 and the IEEE 802.15.1 radio module 103 shown in FIG. 1. In some embodiments of the invention, each of the radio modules may individually comprise an antenna to transceive radio signals. However, one antenna may be designed to be shared among the radio modules to improve area efficiency and the invention should not be limited thereto.

The IEEE 802.11 is a set of standards carrying out Wireless Local Area Network (WLAN) communications in the 2.4, 3.6 and 5 GHz frequency bands. The WLAN module (such as the IEEE 802.11 radio module 101) embedded in the mobile electronic device 100 may be wirelessly used to connect to the Internet to browse web pages, transceive e-mails, chat online, download and play multimedia content, or others. The WLAN is typically implemented as an extension to wired LANs within a building and can provide the final few meters of connectivity between a wired network and mobile or fixed devices. Most WLAN may operate in the 2.4 GHz license-free frequency band and have throughput rates of up to 2 Mbps. The 802.11b standard is only direct sequence, and provides throughput rates of up to 11 Mbps. The 802.11g standard operates at a maximum raw data rate of 54 Mbit/s, or about 19 Mbit/s net throughput. A WLAN module connects users via an access point to the LAN. The Access points (APs) typically receive, buffer, and transmit data between the WLAN module and the wired network infrastructure. Each access point may support, in average, twenty devices and have a coverage varying from 20 meters in area with obstacles (walls, stairways, elevators) and up to 100 meters in area with clear line of sight.

Figure 2:
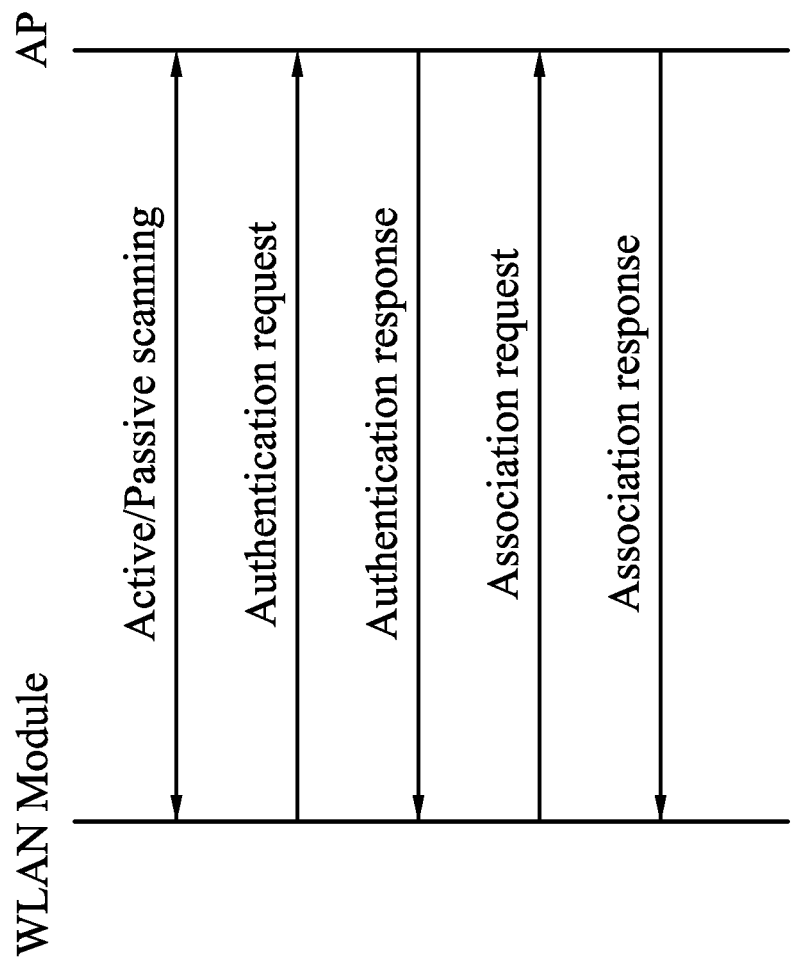
FIG. 2 is a diagram showing an exemplary scanning, authentication and association process of IEEE 802.11.
Figure 3:
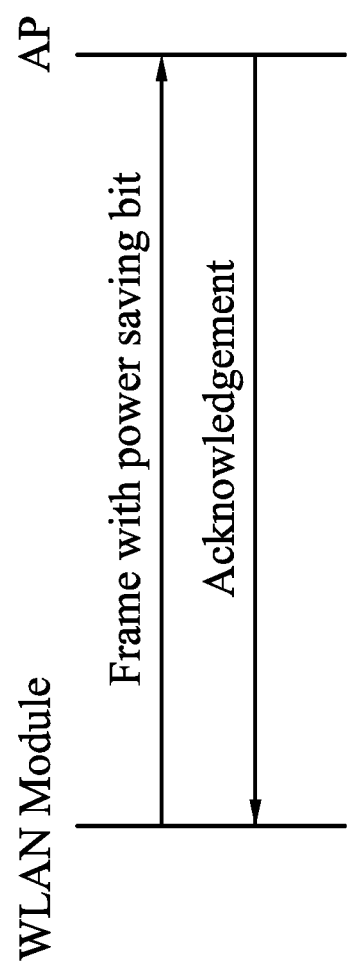
FIG. 3 is a diagram showing exemplary interactions for delivering information indicating that a WLAN module will enter a Power Saving (PS) mode.
Figure 4:
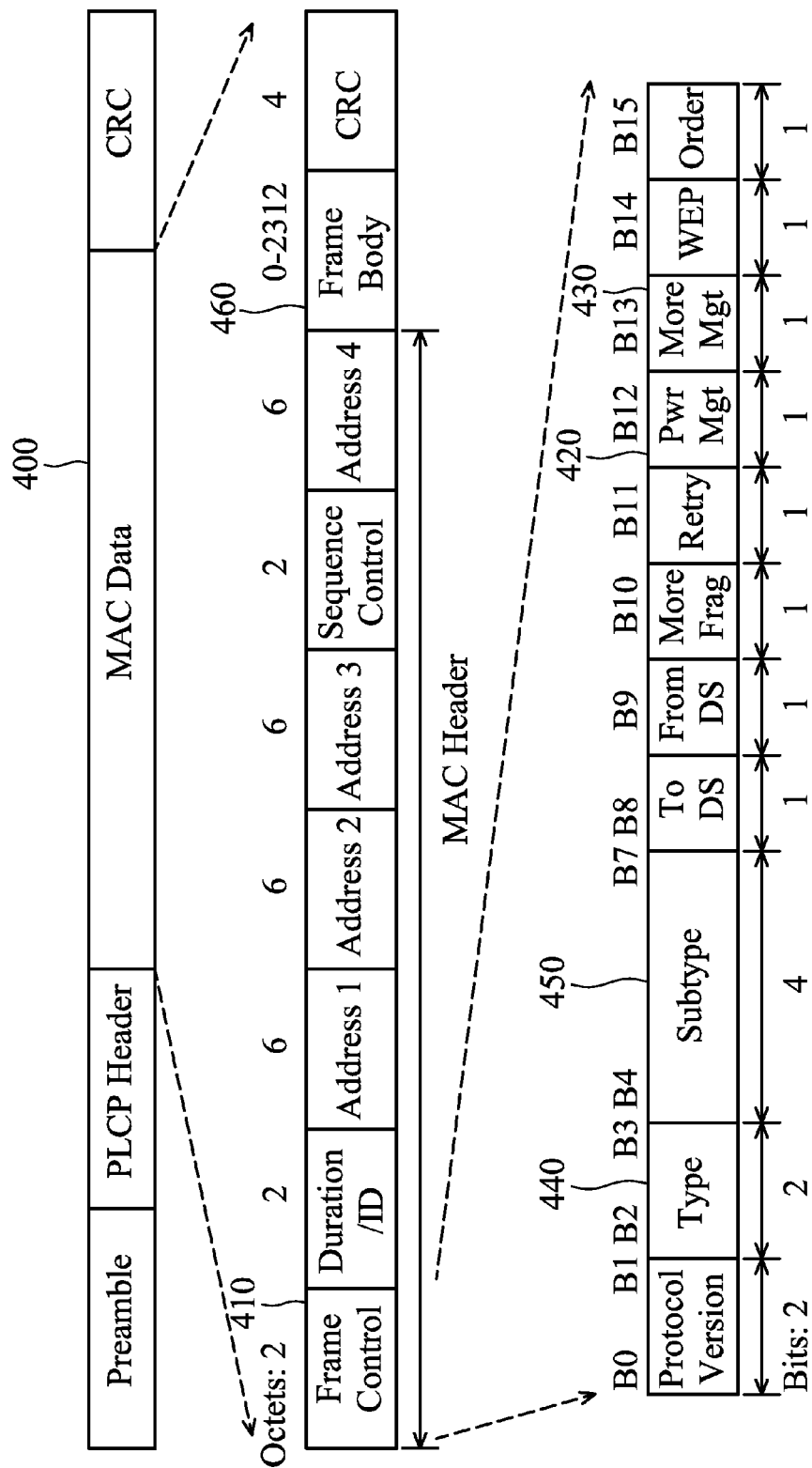
FIG. 4 is a schematic diagram showing an embodiment of a media access control (MAC) frame format.
Figure 5:
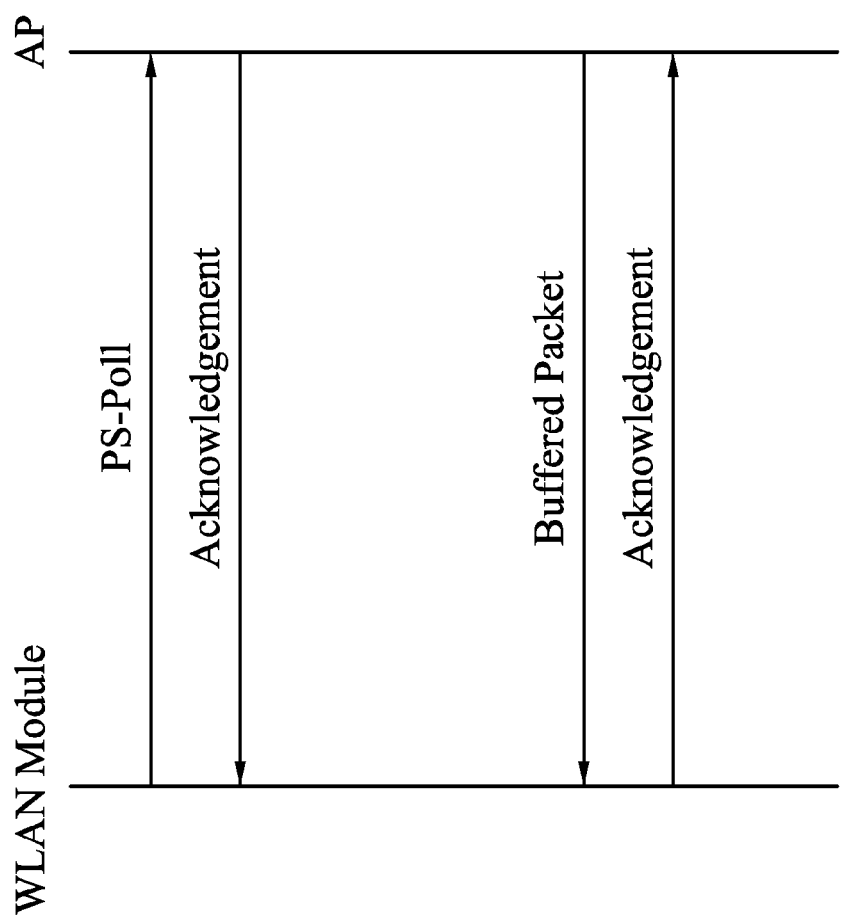
FIG. 5 is diagram showing exemplary interactions for obtaining buffered packets from an access point (AP)

FIG. 2 is a diagram showing an exemplary scanning, authentication and association process of IEEE 802.11. The access process of the WLAN module may involve three steps: active/passive scanning, authentication and association, enabling the WLAN module to associate with an AP. Active scanning is used by the WLAN module to scan surrounding wireless networks and locate a compatible one. In one way of active scanning, the WLAN module prepares a list of channels and broadcasts a probe request (with the SSID null) frame on each of them. The APs that receive the probe request send a probe response. The WLAN module associates with the AP with the strongest signal. In another way, the WLAN module only unicasts a probe request (with a specified SSID). When an AP receives the probe request, it sends a probe response. This active scanning mode enables the WLAN module to access a specified wireless network. Passive scanning is used by the WLAN module to discover surrounding wireless networks through listening to the beacon frames periodically sent by an AP. The WLAN module prepares a list of channels and listens to beacons on each of these channels. To prevent illegal clients from accessing a wireless network, authentication may be needed between the WLAN module and an access controller (AC) managing all APs in a WLAN or between the WLAN and the associated AP. Two types of authentication: open system authentication; and shared key authentication may be employed. When the WLAN module chooses a compatible network with a specified SSID and authenticates to an AP, it sends an association request frame to the AP. The AP sends an association response to the WLAN module and adds the client's information in its database. The WLAN module may go into a power saving (PS) mode (also called a sleep mode) for long time periods. The request, with information indicating that the PS mode will be entered, is carried in a frame as shown in FIG. 3. Such information is carried by a power management bit 420 of a frame control field 410 of MAC data 400, as shown in FIG. 4. Subsequently, the AP may maintain a continually updated record of the WLAN module currently working in the PS mode, and buffer the packets addressed to the WLAN module until the WLAN module specifically requests for the packets by sending a polling request (briefly in PS-Poll) to the AP. As part of a Beacon Frame, the AP may periodically transmit information indicating which WLAN module has packets buffered at the AP, where the information is carried in a Traffic Indication Map (TIM) Information Element of the frame body field 460 of the MAC data 400. Thus, the WLAN module may periodically wake up to receive the Beacon Frame. If there is an indication that at least one packet has been stored at the AP and is waiting for delivery, then the corresponding WLAN module may stay awake and send the PS-Poll to the AP to obtain the buffered packet. For description of signaling between the WLAN module and AP for acquisition of buffered packets, reference may be made to FIG. 5. Furthermore, if there is an indication that data is stored at the AP in the received data frame or management frame, which is carried in the data bit 430 of a frame control field 410 of MAC data 400, then the corresponding WLAN module may stay awake and send a PS-Poll to the AP. The Beacon Frame, PS-Poll, acknowledgment and data frame can be distinguished by the type and subtype bits 440 and 450 of a frame control field 410 of MAC data 400.

Figure 6:
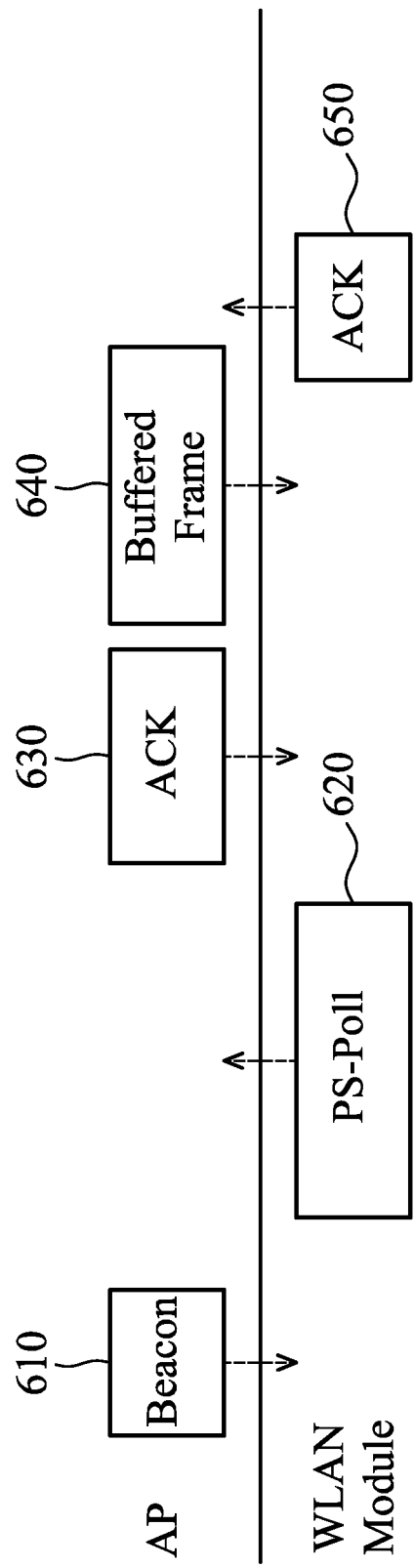
FIG. 6 is a schematic diagram showing frame exchange for obtaining buffered packets in a time line.

FIG. 6 is a schematic diagram showing frame exchange for obtaining buffered packets in a time line. The AP may periodically transmit the beacon frame 610 containing all the information about the network to announce the presence of a WLAN network. When the WLAN module identifies that there are packets buffered at the AP upon the reception of the beacon frame 610, the WLAN module may request the packets by sending a PS-Poll request 620. After receiving a PS-Poll request 620, the AP may reply with an acknowledgment (ACK) 630 and transmit the buffered frame 640. Finally, the WLAN module may reply with an acknowledgment (ACK) 650 to the AP based on the received frame. Note that for the non-mentioned protocols of the WLAN communication, reference may be made to the corresponding IEEE 802.11 standards and are omitted here for brevity.

Figure 7:
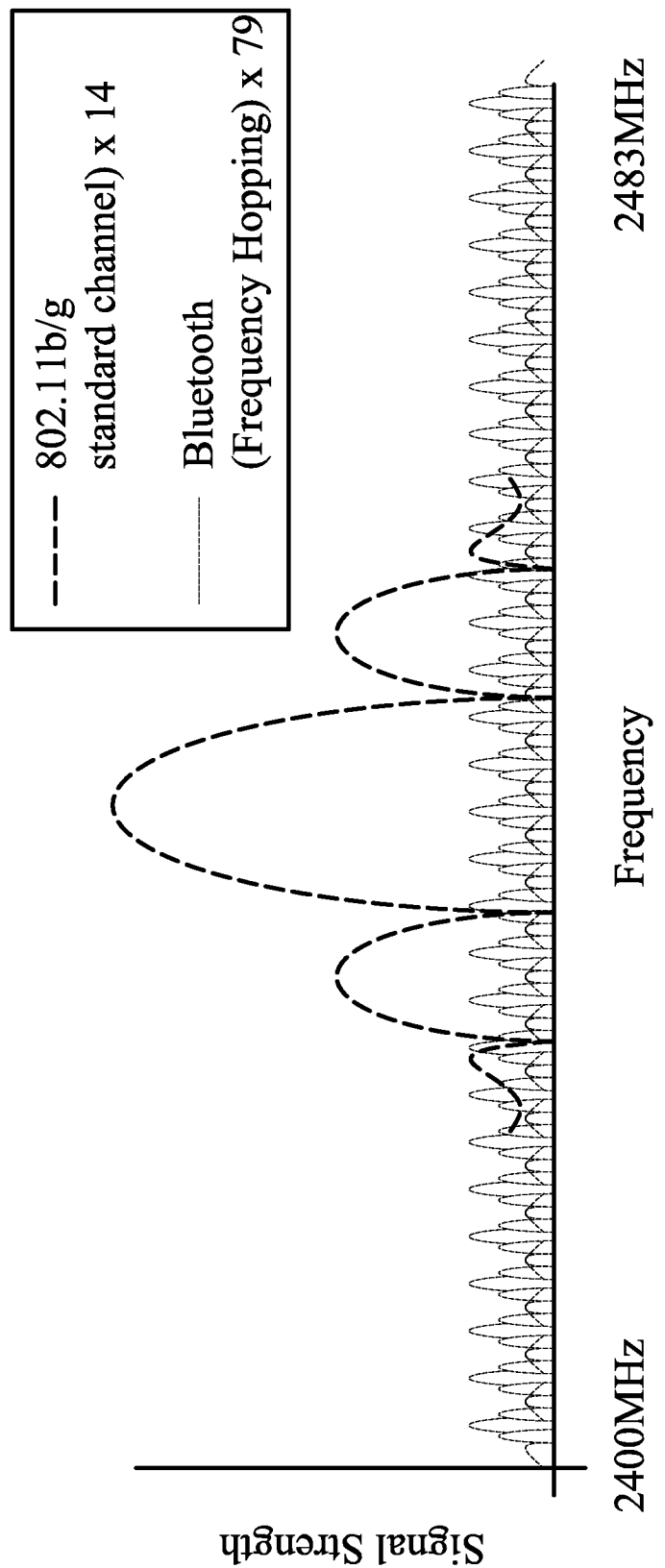
FIG. 7 is a schematic diagram showing frequency interference between WLAN and Bluetooth.

The IEEE 802.15 is the 15$^{th}$ working group of the IEEE 802 and specializes in Wireless Personal Area Network (PAN) standards, wherein the IEEE 802.15.1 is a set of standards for Bluetooth. Bluetooth is an open wireless protocol for exchanging data over short distances from fixed and mobile devices, creating personal area networks. WLAN and Bluetooth both occupy a section of the 2.4 GHz Industrial, Scientific, and Medical (ISM) band, which is 83 MHz-wide. Referring to FIG. 7, Bluetooth uses Frequency Hopping Spread Spectrum (FHSS) and is allowed to hop between 79 different 1 MHz-wide channels in the band. WLAN uses Direct Sequence Spread Spectrum (DSSS) instead of FHSS. Its carrier remains centered on one channel, which is 22 MHz-wide. When the WLAN module (such as the IEEE 802.11 radio module 101) and the Bluetooth (such as the IEEE 802.15.1 radio module 103) are operating in the same area, the single 22 MHz-wide WLAN channel occupies the same frequency space as the 22 of the 79 Bluetooth channels which are 1 MHz-wide. When a Bluetooth transmission occurs on a frequency that lies within the frequency space occupied simultaneous by a WLAN transmission, a certain level of interference may occur, depending on the strength of each signal.

Figure 8:
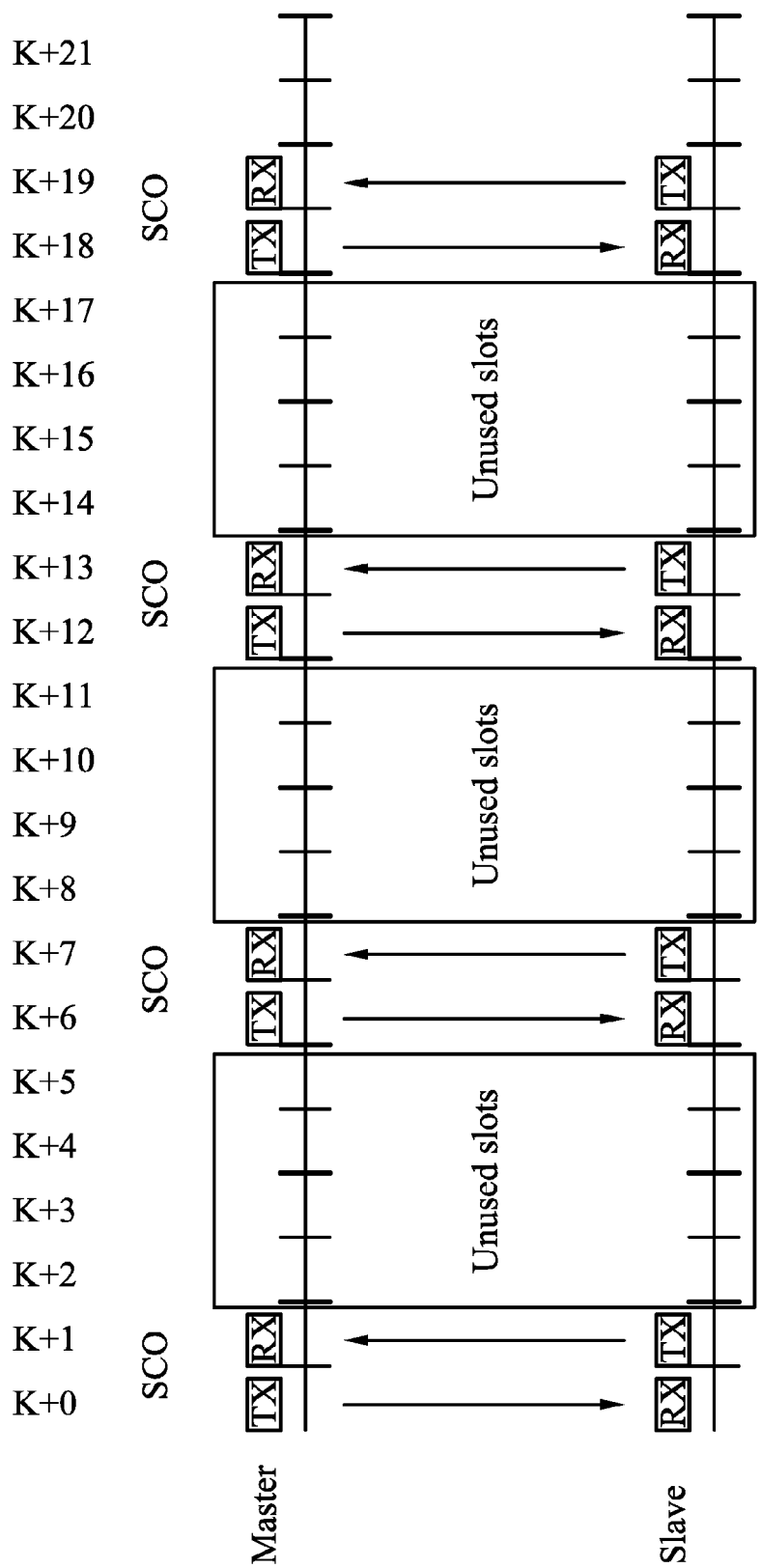
FIG. 8 is a schematic diagram illustrating HV3 packet transmissions at every six slots.

The Bluetooth device (such as the IEEE 802.15.1 device 203) may operate as a master device controlling the PAN and the Bluetooth module (such as the IEEE 802.15.1 radio module 103) may operate as a slave device wirelessly connected to the master device. Bluetooth devices use the inquiry procedure to discover nearby devices, or to be discovered by devices in their locality. A Bluetooth device that tries to find other nearby devices is known as an inquiring device and actively sends inquiry requests. Bluetooth devices that are available to be found are known as discoverable devices and listen for these inquiry requests and send responses. The inquiry procedure uses a special physical channel for the inquiry requests and responses. The procedure for forming connections is asymmetrical and requires that one Bluetooth device carries out the page (connection) procedure while the other Bluetooth device is connectable (page scanning.) The procedure is targeted, so that the page procedure is only responded to by one specified Bluetooth device. The connectable device uses a special physical channel to listen for connection request packets from the paging (connecting) device. This physical channel has attributes that are specific to the connectable device, hence only a paging device with knowledge of the connectable device is able to communicate on this channel. Both paging and connectable devices may already be connected to other Bluetooth devices in a piconet. Two types of connections may be used for communications between a master device and a slave device: SCO/eSCO (synchronous connection oriented/extended synchronous connection oriented) links; and ACL (asynchronous connection oriented) links. The SCO/eSCO link (also called synchronization link) is a symmetric, point-to-point link between a master device and a specific slave device. The master device maintains the SCO/eSCO link by using reserved slots at regular intervals. After establishing the SCO/eSCO link, some synchronous packets (such as HV and DV packets) are typically used for voice transmissions and are not retransmitted. The master device sends synchronous packets at regular intervals, for example, every 2, 4 or 6 slots, depending on packet type used for transmission, where each slot is typically 625 µs. HV and DV packets are typically transmitted via the SCO link and EV packets are typically transmitted via the eSCO link. Exemplary HV3 packet transmissions at every six slots are depicted in FIG. 8. The ACL link (also called asynchronization link) is a point-multipoint link between the master device and all slave devices participating on a PAN. No slot is reserved for the ACL link. The master device establishes an ACL link on a per-slot basis to any slave device. After establishing the ACL link (i.e. entering connection state), ACL packets (such as DM, DH and AUX packets) are typically used for data transmissions.

Figure 9:
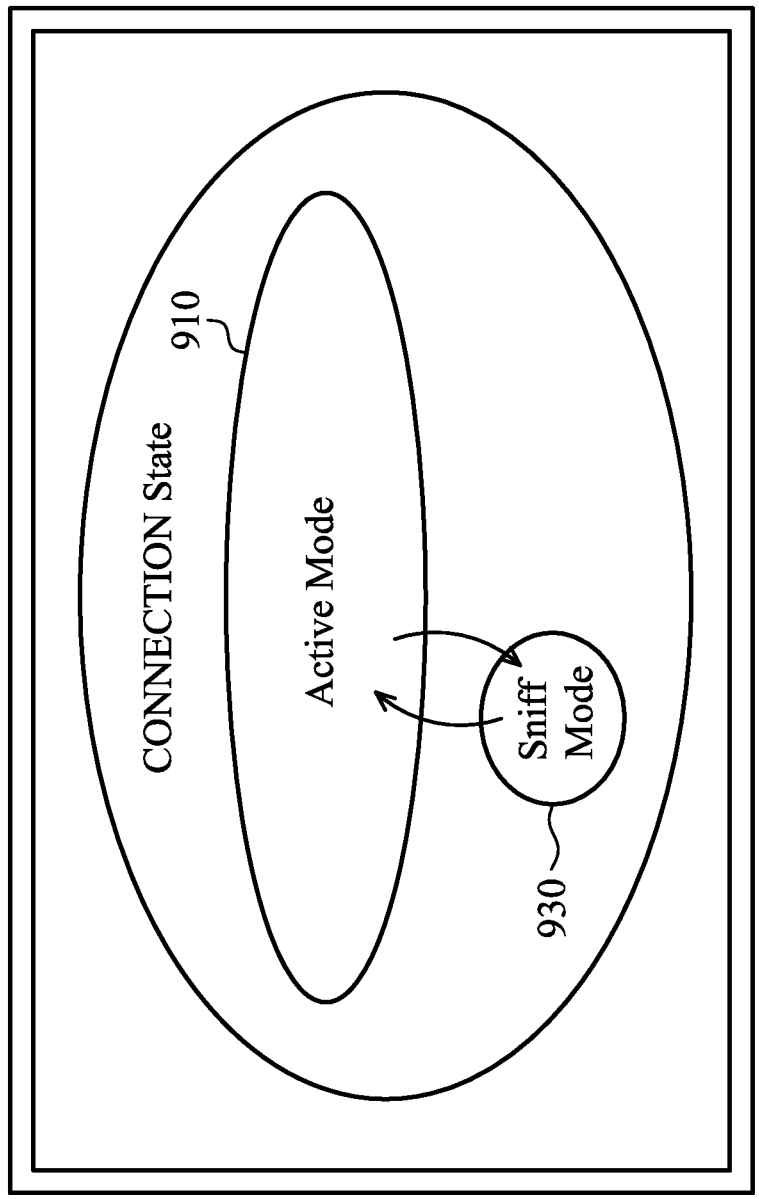
FIG. 9 is a diagram illustrating an exemplary connection state for the asynchronous connection oriented (ACL) link.
Figure 10:
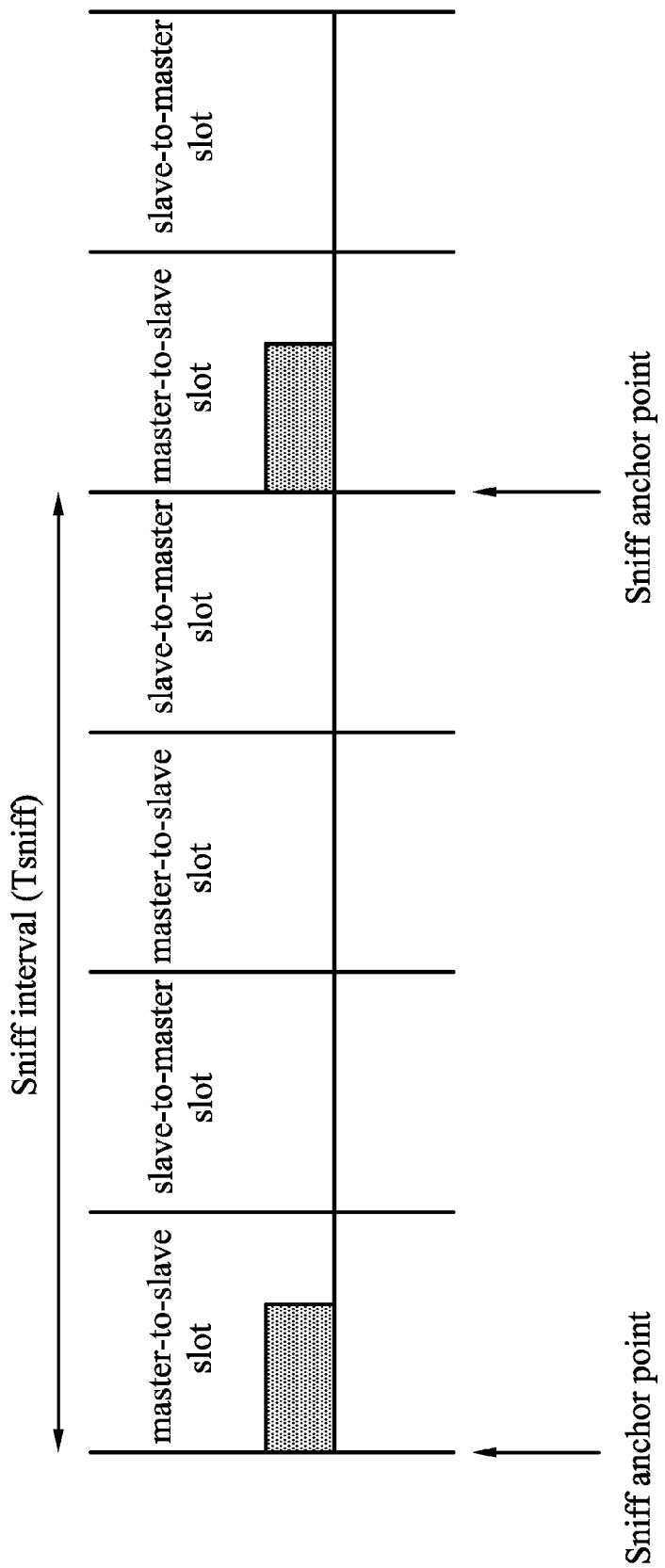
FIG. 10 is a diagram illustrating sniff anchor points.
Figure 11:
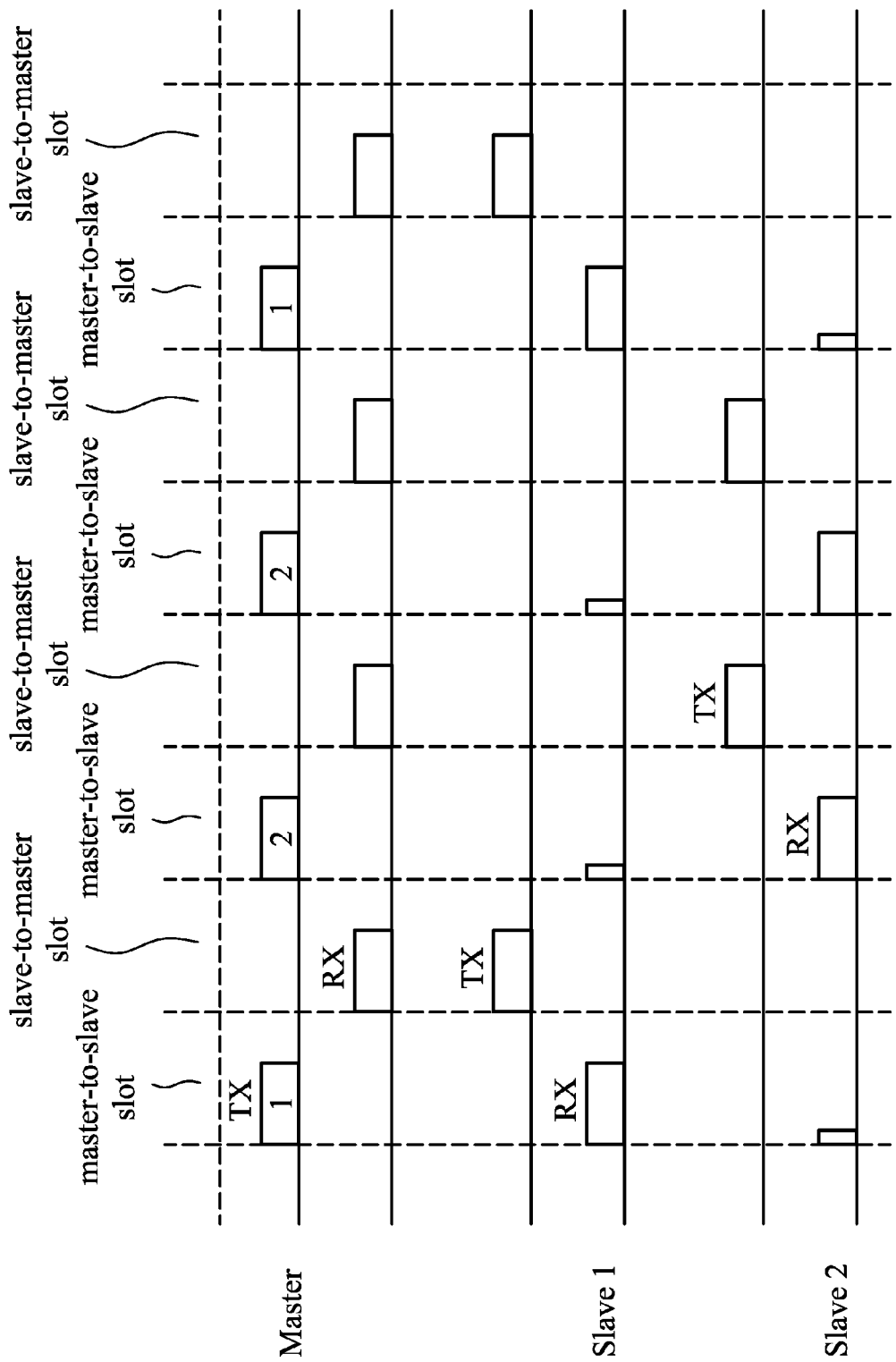
FIG. 11 is a diagram illustrating data transmissions among master and slave devices.

In addition, the master device regularly transmits packets to keep slave devices synchronized to the channel. An exemplary connection state for the ACL link is illustrated in FIG. 9. During the active mode of a connection state 910, both master and slave devices actively participate on a channel. The master device schedules the transmission based on traffic demand to and from different slave devices. If an active slave device is not addressed, the active slave device sleeps until the next master transmission. During a sniff mode of the connection state 930, the slots that a slave device listens to are reduced to save power consumption. Additionally, during the sniff mode 930, the master device switches between transmitting and receiving packets to and from a slave device for sniff attempts containing 2, 4, 6, or 8 slots or more, after reaching sniff anchor points. FIG. 10 illustrates sniff anchor points. The sniff anchor points are regularly spaced with an interval of $T_{sniff}$. During an active mode of a connection state 910, the master device transmits data to a slave device via any on of the master-to-slave slots. During the sniff mode 930, a master device transmits data to a slave device in one or more of the master-to-slave slots for a sniff attempt after a sniff anchor point (e.g. a sniff attempt of Tsniff of FIG. 10 after a sniff anchor point). FIG. 11 is a diagram illustrating data transmissions among master and slave devices. In both active and sniff modes, a slave device transmits data to a master device in a slave-to-master slot after receiving data from the master device from a prior master-to-slave slot. A slave device may transmit a data packet (also referred to as transmitting data) or a null packet (also referred to as acknowledging) to a master device after receiving a poll/null packet (also referred to as polled by the mater node) or a data packet (also referred to as receiving data) from the master device. In order to prevent the ACL link from disconnection, during the active mode 910, a slave device frequently listens via master-to-slave slots, and during the sniff mode 930, a slave device listens via master-to-slave slots when reaching sniff anchor points. It should be noted that the ACL link to a slave device is automatically disconnected by a master device if no response is received after a predetermined number of pollings or transmissions, or for a predetermined time period. It should also be noted that for the non-mentioned protocols of Bluetooth, reference may be made to the corresponding IEEE 802.15 standards and are omitted here for brevity.

Figure 12A:
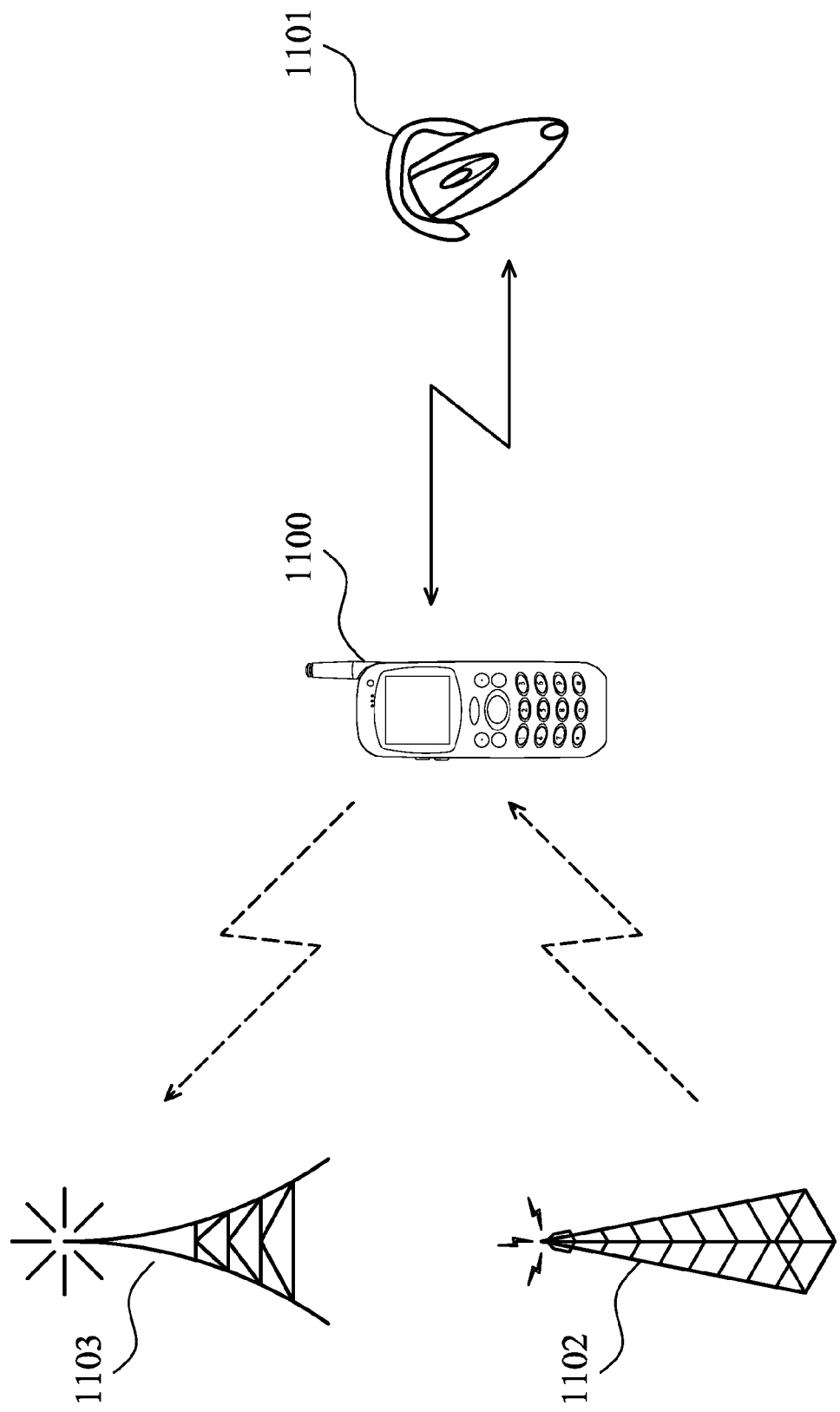
FIG. 12a to FIG. 12c shows some exemplary multi-radio coexistence scenarios
Figure 12B:
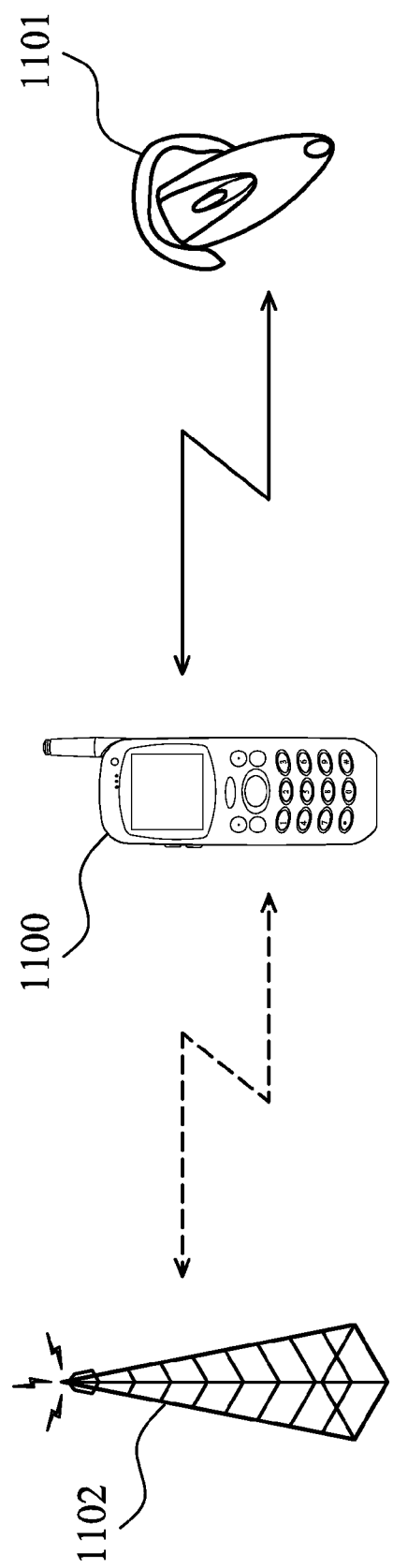
Figure 12C:
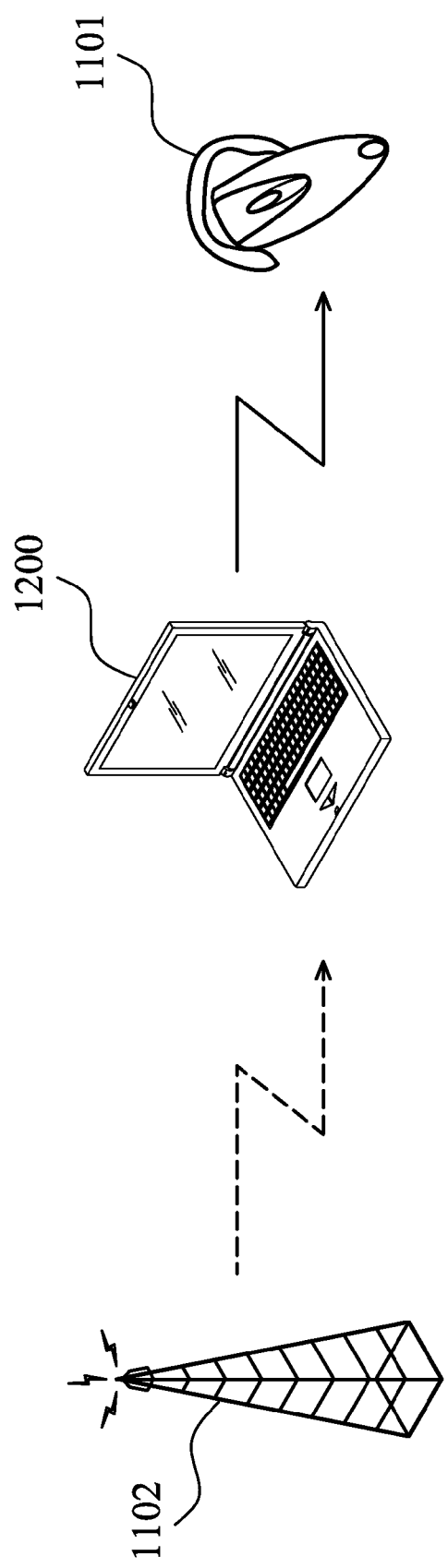

The IEEE 802.16 (Worldwide Interoperability for Microwave Access, WiMAX) is a wireless broadband access standard, designed for outdoor, long-range and carrier-class applications with high throughput. The 802.16 standard supports both licensed and license-exempt spectrums, where 802.16a specifies the operation in the 2-10 GHz band, supporting raw bit rates of up to 75 Mb/s with variable channel bandwidths of 1.5 MHz to 20 MHz. The WiMAX module (such as the IEEE 802.16 radio module 102) may use Orthogonal Frequency-Division Multiplexing (OFDM) technology with 20 MHz-wide bandwidth. The operating frequency band of a WiMAX communications service is close to the operating frequency bands of the WLAN and the Bluetooth communications services as shown in Table 1. FIG. 12a to FIG. 12c shows exemplary multi-radio coexistence scenarios. The cellular phone 1100 and laptop device 1200 may be the embodiments of the mobile electronic device 100 and may comprise an IEEE 802.16 radio module providing a WiMAX communications service and at least one of an IEEE 802.15.1 radio module providing a Bluetooth communications service, and an IEEE 802.11 radio module providing a WLAN communications service. For the details of the hardware architecture of the co-located radio modules, reference may be made to FIG. 1 and the corresponding description and are omitted here for brevity.

Figure 13:
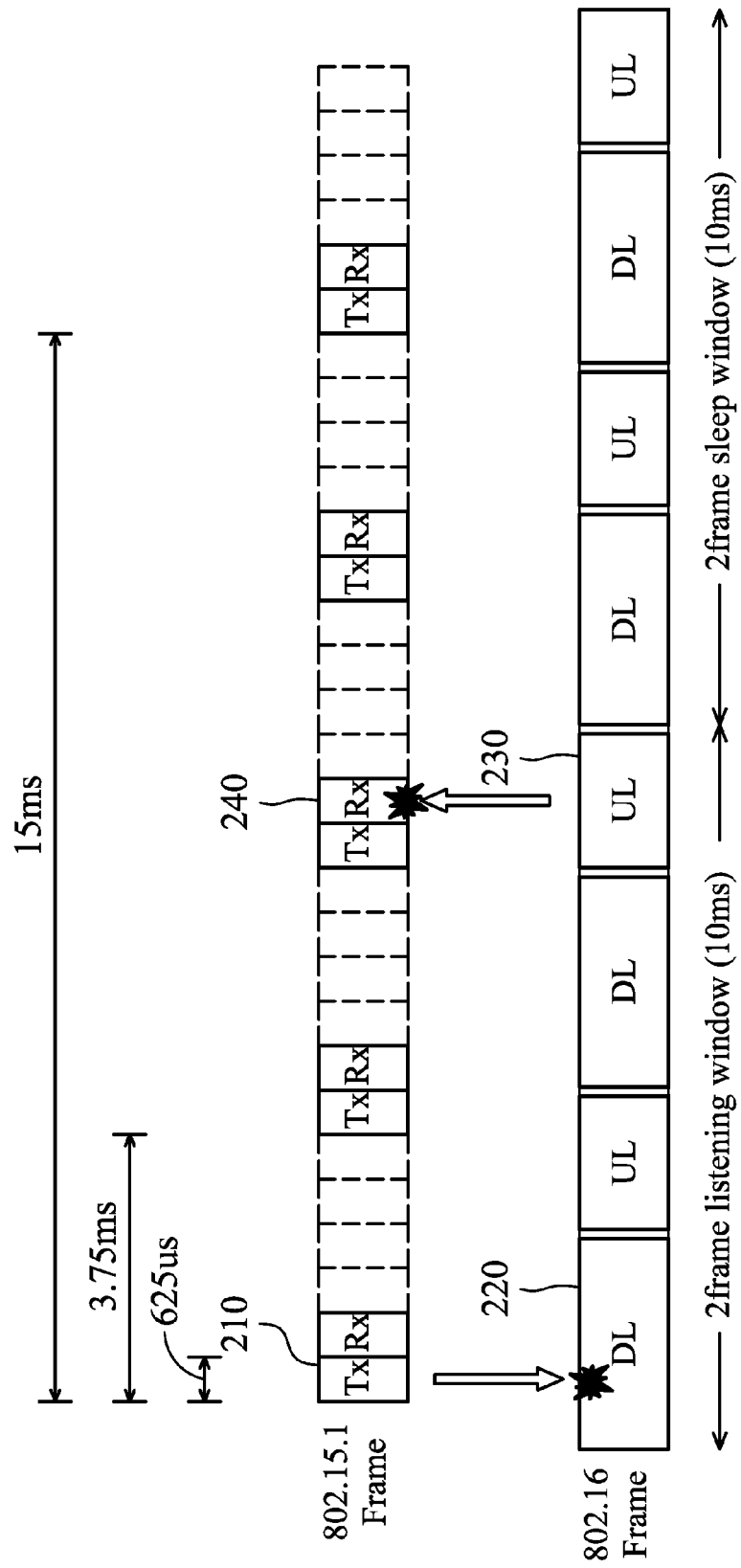
FIG. 13 are schematic traffic patterns showing the transmitting and receiving frame allocations.

As shown in FIG. 12a, the cellular phone 1100 may utilize a full duplex voice call GSM communications service through the base station 1103 while at the same time, perform Internet browsing over WiMAX via the relay station 1102. The cellular phone 1100 may transmit the voice data through the established PAN to a Bluetooth handset 1101 and receive speech signals captured by a microphone of the Bluetooth handset 1101 via an embedded Bluetooth module (such as the IEEE 802.15.1 radio module 103 shown in FIG. 1). Because the WiMAX module (such as the IEEE 802.16 radio module 102 shown in FIG. 1) and Bluetooth module operate in adjacent frequency bands as previously described and are located in close physical proximity to one another as shown in FIG. 1, interference may occur therebetween. FIG. 13 are exemplary traffic patterns showing an 802.15.1 transmitting (Tx) and receiving (Rx) data frame allocation and an 802.16 downlink (DL) and uplink (UL) data frame allocation. When the Bluetooth module transmits data via the air interface to the Bluetooth handset 1101 in the 802.15.1 frame 210, and at the same time the WiMAX module receives data from the relay station 1102 via the air interface in the 802.16 frame 220, the transmitted Bluetooth data may be captured by the WiMAX module, wherein interference occurs. Similarly, when the WiMAX module transmits data via the air interface to the relay station 1102 in the 802.16 frame 230 and the Bluetooth module at the same time receives data from the Bluetooth handset 1101 via the air interface in the 802.15.1 frame 240, the transmitted WiMAX data may be captured by the Bluetooth module, wherein interference occurs. The interference problem becomes more serious when the transmitted WiMAX data is captured by the Bluetooth module because the Tx power of WiMAX for long-distance transmission is generally much stronger than the Rx power accepted by the Bluetooth module.

FIG. 12b shows another scenario of interference caused between the Bluetooth and WLAN modules. The cellular phone 1100 may utilize a Voice over Internet Protocol (VoIP) communications service, while at the same time, the VoIP data from Internet may be received through WLAN connection via the WLAN module (such as the IEEE 802.11 radio module 101 shown in FIG. 1) and vice versa. Then, the cellular phone 1100 may transmit the voice data through the established PAN to the Bluetooth handset 1101 and receive speech signals captured by a microphone of the Bluetooth handset 1101 via the Bluetooth module. Because both the WLAN module and Bluetooth module share spectrums as previously described and are located in close physical proximity to one another as shown in FIG. 1, interference may occur therebetween. FIG. 12c shows still another scenario of interference caused between the Bluetooth and WiMAX modules. The laptop device 1200 may receive multimedia streaming or data over WiMAX from the relay station 1102 and at the same time transmit audio data to the Bluetooth handset 1101. The Bluetooth handset 1101 may be employed as a wireless earphone to play music received from the laptop device 1200 as shown in FIG. 12c. The laptop device 1200 and the Bluetooth handset 1101 may be compatible with Advanced Audio Distribution Profile (A2DP). A unidirectional 2-channel stereo audio stream, such as an MPEG-1, MPEG-2, MPEG-4, Advanced Audio Coding (AAC), Adaptive Transform Acoustic Coding (ATRAC), or other audio streams, may be delivered from the Bluetooth module of the laptop device 1200 to the Bluetooth handset using ACL links. However, because the WiMAX module and Bluetooth module operate in adjacent frequency bands as previously described and are located in close physical proximity to one another as shown in FIG. 1, interference may occur therebetween. Therefore, in order to avoid interference therebetween, a method for coordinating the operations of the CLC radio modules in a communications apparatus is highly required.

Figure 14:
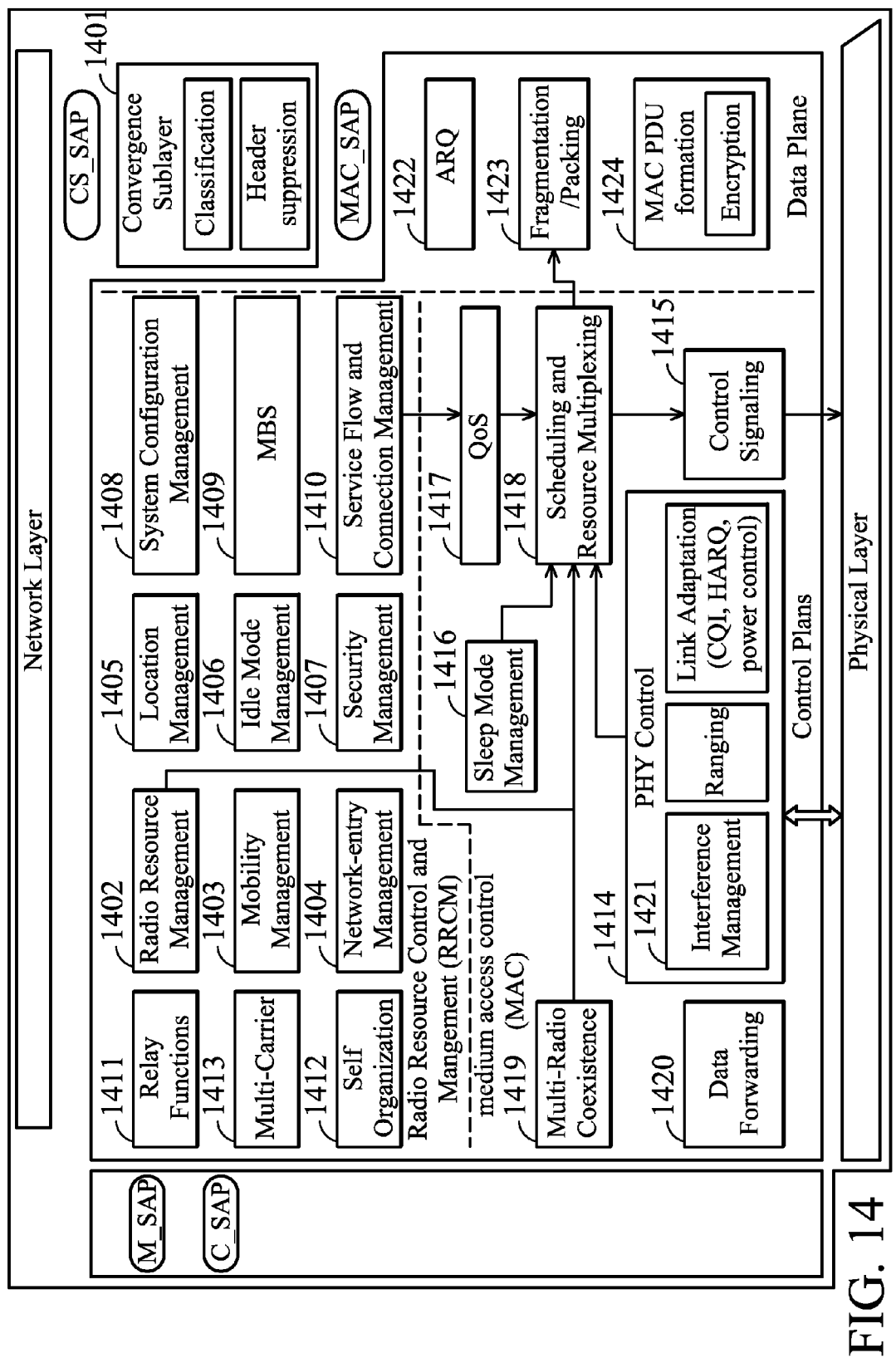
FIG. 14 is a block diagram showing the IEEE 802.16m protocol structure.

FIG. 14 is a block diagram showing the IEEE 802.16m protocol structure. The IEEE 802.16m Medium Access Control (MAC) is divided into two sublayers: a convergence sublayer (CS) 1401 and a common Part sublayer (CPS). The MAC Common Part Sublayer is further classified into Radio Resource Control and Management (RRCM) functions and Medium Access Control (MAC) functions. The RRCM functions fully reside on the control plane. The MAC functions reside on the control and data planes. The RRCM functions include several functional blocks that are associated with radio resource functions such as:

Radio Resource Management (1402);
Mobility Management (1403);
Network-entry Management (1404);
Location Management (1405);
Idle Mode Management (1406);
Security Management (1407);
System Configuration Management (1408);
Multicast Broadcast Service (MBS) (1409);
Service Flow and Connection Management (1410);
Relay Functions (1411);
Self Organization (1412); and
Multi-Carrier (1413).

The Radio Resource Management block 1402 adjusts radio network parameters based on traffic load, and also include functions of load control (load balancing), admission control and interference control. The Mobility Management block 1403 supports functions related to Intra-RAT/Inter-RAT handover. The Mobility Management block 1403 handles the Intra-RAT/Inter-RAT Network topology acquisition which includes advertisement and measurement, manages candidate neighbor target Base Stations (BSs)/Yardstick Base Stations (YBSs)/Advanced Base Stations (ABSs)/Relay Stations (RSs)/Advanced Relay Stations (ARSs) and also decides whether the Mobile Station (MS)/Advanced Mobile Station (AMS) should perform the Intra-RAT/Inter-RAT handover operation. The Network-entry Management block 1404 is utilized for initialization and access procedures. The Network-entry Management block 1404 may generate management messages which are needed during access procedures, i.e., ranging, basic capability negotiations, registration, and so on. The Location Management block 1405 is utilized for supporting a location based service (LBS). The Location Management block 1405 may generate messages including the LBS information. The Idle Mode Management block 1406 manages location update operations during the Idle Mode. The Idle Mode Management block 1406 controls the Idle Mode operation, and generates a paging advertisement message based on paging messages from the paging controller of the core network side. The Security Management block 1407 is utilized for authentication/authorization and key management for secure communications. The System Configuration Management block 1408 manages system configuration parameters, and transmits system configuration information to the MS/AMS. The E-MBS (Enhanced-Multicast Broadcast Service) block 1409 controls management messages and data associated with broadcasting and/or multicasting service. The Service Flow and Connection Management block 1410 allocates Station Identifiers (STID) and Flow Identifiers (FIDs) during access/handover/service flow creation procedures. The Relay Functional block 1411 includes functions to support multi-hop relay mechanisms. The functions include procedures to maintain relay paths between an ABS and an access ARS. The Self Organization block 1412 performs functions to support self configuration and self optimization mechanisms. The functions include procedures to request RSs/MSs to report measurements for self configuration and self optimization and receive the measurements from the RSs/MSs. The Multi-carrier (MC) block 1413 enables a common MAC entity to control a Physical (PHY) spanning over multiple frequency channels. The channels may be of different bandwidths (e.g. 5, 10 and 20 MHz) on contiguous or non-contiguous frequency bands. The channels may be of the same or different duplexing modes, e.g. Frequency Division Duplex (FDD), Time Division Duplex (TDD), or a mix of bidirectional and broadcast only carriers. For contiguous frequency channels, the overlapped guard sub-carriers are aligned in frequency domain in order to be used for data transmission.

The control plane part of the Medium Access Control (MAC) functional group includes functional blocks which are related to the physical layer and link controls such as:

PHY Control (1414);
Control Signaling (1415);
Sleep Mode Management (1416);
Quality of Service (QoS) (1417);
Scheduling and Resource Multiplexing (1418);
Multi-Radio Coexistence (1419);
Data Forwarding (1420);
Interference Management (1421); and
Inter-ABS Coordination.

The PHY Control block 1414 handles PHY signaling such as ranging, measurement/feedback (CQI), and Hybrid Automatic Repeat reQuest (HARQ) ACK/NACK. Based on CQI and HARQ ACK/NACK, the PHY Control block estimates channel quality as seen by the MS/AMS, and performs link adaptation by adjusting modulation and coding schemes (MCS), and/or power levels. During the ranging procedure, the PHY control block 1414 performs UL synchronization with power adjustment, frequency offset and timing offset estimation. The Control Signaling block 1415 generates resource allocation messages. The Sleep Mode Management block 1416 handles Sleep Mode operations. The Sleep Mode Management block 1416 may also generate MAC signaling related to sleep operations, and may communicate with the Scheduling and Resource Multiplexing block 1418 to operate according to the sleep period. The QoS block 1417 handles QoS management based on QoS parameters input from the Service Flow and Connection Management block 1410 for each connection. The Scheduling and Resource Multiplexing block 1418 schedules and multiplexes packets based on properties of connections. In order to reflect properties of connections, the Scheduling and Resource Multiplexing block 1418 receives QoS information from the QoS block for each connection. The Multi-Radio Coexistence block 1419 performs functions to support concurrent operations of IEEE 802.16m and non-IEEE 802.16 radios collocated on the same mobile station. The Data Forwarding block 1420 performs forwarding functions when RSs are present on the path between the ABS and AMS. The Data Forwarding block 1420 may cooperate with other blocks such as the Scheduling and Resource Multiplexing block 1418 and the MAC Protocol Data Unit (PDU) formation block 1424. The Interference Management block 1421 performs functions to manage inter-cell/sector interference. The operations may include: MAC layer operations and PHY layer operations. MAC layer operations may comprise: Interference measurement/assessment reports sent via MAC signaling and Interference mitigation by scheduling and flexible frequency reuse. The PHY layer operations may comprise: Transmit power control, Interference randomization, Interference cancellation, Interference measurement, and Tx beamforming/precoding.

The Inter-ABS coordination block performs functions to coordinate the actions of multiple ABSs by exchanging information, e.g., interference management. The functions include procedures to exchange information for, as an example, interference management between the ABSs, by backbone signaling and by MS/AMS MAC messaging. The information may include interference characteristics, e.g. interference measurement results, etc. The data plane includes the following MAC functions:

ARQ (1422);
Fragmentation/Packing (1423); and
MAC PDU formation (1424).

The ARQ block 1422 handles MAC ARQ functions. For ARQ-enabled connections, the ARQ block logically splits the MAC Service Data Unit (SDU) to ARQ blocks, and numbers each logical ARQ block. The ARQ block may also generate ARQ management messages such as feedback messages (ACK/NACK information). The Fragmentation/Packing block 1423 performs fragmentation of or packing of MSDUs (MAC Service Data Unit) based on scheduling results from the Scheduling and Resource Multiplexing block. The MAC Protocol Data Unit (PDU) formation block 1424 constructs the MAC PDU so that ABS/AMS can transmit user traffic or management messages into the PHY channel. The MAC PDU formation block 1424 adds a MAC header and may add sub-headers.

Figure 15:
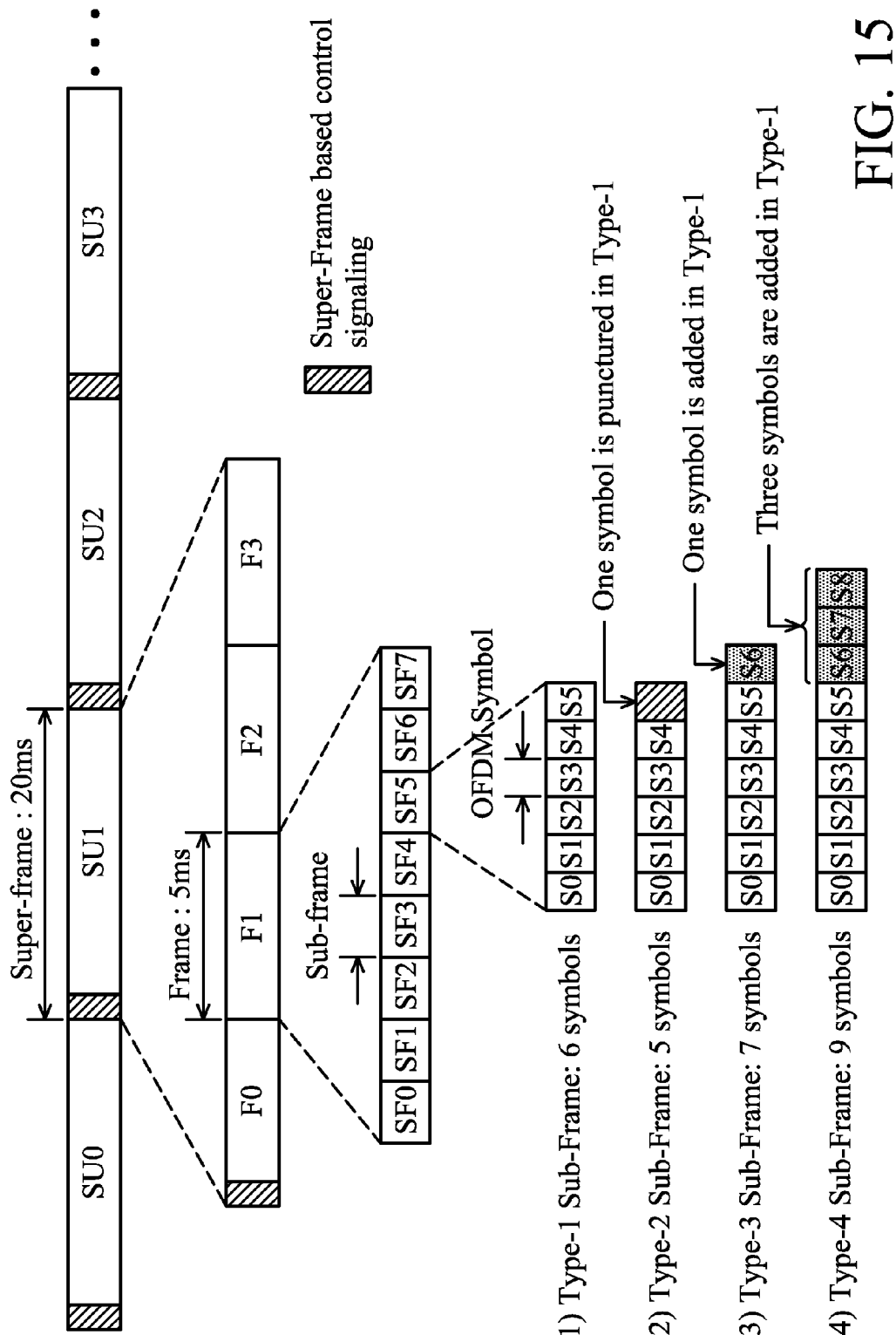
FIG. 15 shows a basic WiMAX frame structure in accordance with an embodiment of the invention.

FIG. 15 shows a basic WiMAX frame structure in accordance with an embodiment of the invention. Each 20 ms super-frame is divided into four equally-sized 5 ms radio frames. When using the same OFDMA parameters with the channel bandwidth of 5 MHz, 10 MHz, or 20 MHz, each 5 ms radio frame further consists of eight sub-frames. A sub-frame is assigned for either DL or UL transmissions. There are four types of sub-frames depending on the size of the cyclic prefix: 1) the type-1 sub-frame which consists of six OFDMA symbols (some of which may be idle symbols), 2) the type-2 sub-frame that consists of five OFDMA symbols with one symbol punctured, 3) the type-3 sub-frame that consists of seven OFDMA symbols with one symbol added, and 4) the type-4 sub-frame that consists of nine OFDMA symbols with three symbol added.

Referring back to FIG. 1, according to the embodiments of the invention, the IEEE 802.16 radio module 102 may provide protocols to support multi-radio coexistence operations. In an embodiment of the invention, the CLC Radio Manager 104 may provide interfaces for the radio modules 101, 102 and 103, detect activities of the radio modules 101, 102 and 103, collect the information (such as the time characteristics and radio characteristic) regarding the co-located radio activities directly from the corresponding CLC radio modules or an inter-radio interface internal to the mobile electronic device 100, and generate management messages to a multi-radio coexistence processing module (as the multi-radio coexistence functional block 1419 shown in FIG. 14) to respond with corresponding actions to support multi-radio coexistence operations. Note that the CLC Radio Manager 104 may also be implemented inside of the radio modules 101, 102 and/or 103 and the invention should not be limited thereto.

According to the embodiments of the invention, the IEEE 802.16 radio module 102 and the base station (BS) or relay station (RS) (such as the relay station 1102 and base station 1103) may communicate with each other via air interface. The IEEE 802.16 radio module 102 may generate management messages to report the information about its co-located radio activities obtained directly from inter-radio interface or from the CLC Radio Manager 104, and the BS or RS may generate management messages to respond with the corresponding actions to IEEE 802.16 radio module 102 to support multi-radio coexistence operation. Furthermore, the multi-radio coexistence functional block 1419 at the BS or RS may communicate with the Scheduling and Resource Multiplexing functional block 1418 to operate according to the reported co-located coexistence activities. The multi-radio coexistence function may be used independently from the Sleep Mode operation to allow optimal power efficiency with a high level of coexistence support. However, when the Sleep Mode provides sufficient co-located coexistence support, the multi-radio coexistence function may not be used.

The IEEE 802.16 radio module 102 may conduct pre-negotiated periodic absences from the serving BS to support concurrent operations of co-located non-802.16 radios, i.e. the CLC radios such as IEEE 802.11, IEEE 802.15.1 and so on, and the time pattern of such periodic absence may be classified into a plurality of CLC classes to achieve optimal time and/or spectrum efficiency. There may be three types of CLC classes, differing from each other in terms of the time unit of CLC start time, active cycle and active interval, as shown in Table 2. The CLC active interval is the time duration of a CLC class designated for co-located non-802.16 radio activities. The CLC active cycle is the time interval of the active pattern of a CLC class repetition. The CLC start time is the start time of a CLC class.

TABLE 2

Time Unit of CLC Class Parameters

| | CLC active cycle | CLC active interval | CLC start time |
|---|---|---|---|
| Type I | microsecond | sub-frame | sub-frame |
| Type II | frame | sub-frame | frame |
| Type III | not applicable | super-frame | super-frame |

According to the embodiments of the invention, the IEEE 802.16 radio module 102 may determine the CLC active interval and the CLC active cycle based on the activities of the co-located non-802.16 radios. The mobile electronic device 100 may determine the CLC start time of Type I or Type II CLC class. The BS may determine the CLC start time of Type II or III CLC class. The Type I CLC class may be recommended to be utilized for non-802.16 radio activity that has low duty cycle, and may not align with the 802.16 frame boundary. Otherwise, the Type II CLC class may be recommended to be utilized for scheduling flexibility. The Type III CLC class may be recommended to be utilized for continuous non-802.16 radio activity that lasts for a longer than desired time, e.g. seconds.

According to an embodiment of the invention, when a communications status of a co-located non-802.16 radio module (also referred to as the CLC radio module, such as the IEEE 802.11 radio module 101 or the IEEE 802.15.1 radio module 103) has been changed, a learning phase may be entered for the IEEE 802.16 (WiMAX) radio module 102 and/or the CLC radio manager 104 to identify the radio characteristic of the corresponding CLC radio modules. According to the embodiment of the invention, the CLC Radio Manager 104 interfacing between the radio modules 101, 102 and 103 may detect the activity of each CLC radio module so as to be aware of communications status changes. The communications status change may happen when, as an example, the Bluetooth module or the WLAN module turns on, off or down, the Bluetooth module performs the inquiry procedure to discover nearby devices or the page (connection) procedure to establish a particular link, the WLAN module performs the access process to attempt to associate with an AP or changes between different communications modes, the Bluetooth module changes between the sniff mode 930 and active mode 910 as shown in FIG. 9, and so on. In an embodiment of the invention, the radio modules 101, 102 and 103 may conduct a signal to the CLC Radio Manager 104 via a hardware pin or issue a software/firmware interrupt signal to indicate the activation/deactivation of the corresponding radio module. In another embodiment of the invention, the CLC Radio Manager 104 may also monitor the radio signals of the radio modules 101, 102 and/or 103 to estimate the extent of the signal interference according to the signal power. As an example, when the signal power of the radio signal of the WiMAX module 102 is continuously degraded, it may mean that another radio module has been activated which causes signal interference.

Figure 16:
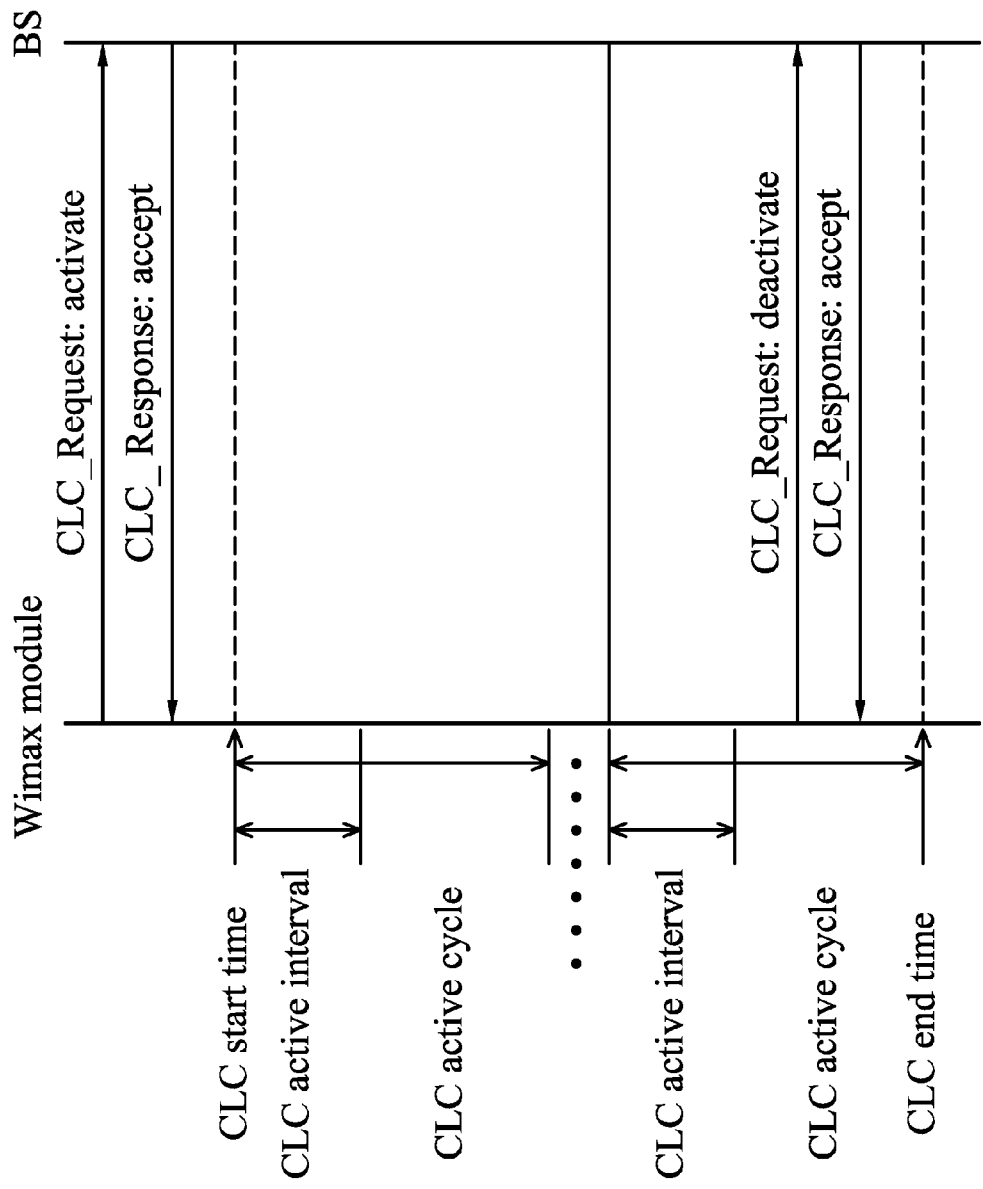
FIG. 16 is a interaction diagram showing the message flow of the CLC requests according to an embodiment of the invention.

In the learning phase, the WiMAX module 102 may request a period of absence from the serving BS to support the initial setup or connection setup operation of the CLC radio modules. FIG. 16 is an interaction diagram showing the message flow of CLC requests according to an embodiment of the invention. The WiMAX module 102 may send a CLC_Request to the serving BS to indicate activation of a CLC radio module and request a period of absence. The serving BS may respond to the CLC_Request before the CLC start time. When the serving BS accepts the CLC_Request, it is preferable to avoid data transmission between the serving BS and the WiMAX module during this period. That is, the radio resource of the mobile electronic device 100 is preferable to be reserved during this period for the activation of co-located non-802.16 radio module to obtain its radio characteristics. According to an embodiment of the invention, the radio characteristics of the CLC radio module may comprise a transmission power, reception sensitivity, a traffic pattern (such as the traffic pattern shown in FIG. 13) and so on. Afterward, the WiMAX module 102 and/or the CLC radio manager 104 may further identify the obtained radio characteristics from the activated/activating CLC radio module. The WiMAX module 102 may send another CLC_Request to the serving BS to indicate the deactivation of the co-located non IEEE 802.16 radio module when detecting the CLC radio module has been deactivated or to indicate that the initial setup or connection setup of the CLC radio module has finished. The data transmission between the serving BS and the WiMAX module may resume thereafter.

In the embodiments of the invention, the WiMAX module 102 may send the CLC_Request message to activate, terminate, or reconfigure one or several Type I, Type II, or/and Type III CLC classes. Table 3 lists the CLC_Request message parameters.

TABLE 3 the CLC_Request message parameters

Management Message Type
Request Action
Request Action Parameters

The Request Action is a byte of information. When bit # i of the Request Action field is set to "0", it indicates that the WiMAX module 102 has requested to terminate the existing CLC class with CLC ID=i if the CLC class with CLC ID=i exists. The CLC identifier (CLC ID) is an integer number (0~7) to uniquely identify a CLC class. On the other hand, when the bit # i of the Request Action field is set to "1", it indicates that the WiMAX module 102 has requested to activate the CLC class with CLC ID=i. For an existing CLC ID, the MS may keep its existing configuration, and request to re-configure or replace its existing CLC class. The requested action parameters may be included as a CLC Information compound. These parameters may be present more than once if the WiMAX module 102 wants to include multiple CLC information fields. The CLC Information may comprise the CLC ID, CLC class type, a traffic pattern, a start time for the radio parameter to take effect, and so on. According to an embodiment of the invention, the traffic pattern may be described by a finer resolution of up to a sub-frame time unit so as to improve time and/or spectrum efficiency. The methods to describe the traffic pattern may comprise a bitmap, a coexistence ratio, active and inactive windows, a real-time (fast) feedback, and so on (the traffic pattern will be discussed in detail in the following paragraphs). Table 4 lists the parameters of CLC Information parameters applicable to the CLC_Request message.

TABLE 4 parameters of CLC Information parameters applicable to the CLC_Request message.

| Parameters | Note |
| --- | --- |
| Parameter set for each requested Type I, II, or III CLC class | |
| CLC ID | |
| Scheduling Impact | |
| Start Superframe Number | |
| Start Frame Index | |
| Flag | |
| CLC active interval of Type I CLC class | If (Flag == 0b00) |
| CLC active cycle of Type I CLC class | If (Flag == 0b00) |
| Start Subframe Index | If (Flag == 0b00) |
| CLC Active Interval of Type II CLC class with subtype 1 | If (Flag == 0b01) |
| CLC Active cycle of Type II CLC class with subtype 1 | If (Flag == 0b01) |
| Extended Bitmap Indicator | If (Flag == 0b10) |
| CLC Active Bitmap | If (Extended Bitmap Indicator == 0) |
| Length of Extended CLC Active Bitmap (k) | If (Extended Bitmap Indicator == 1) |
| Extended Bitmap Indicator | If (Flag == 0b10) |
| CLC Active Bitmap | If (Extended Bitmap Indicator == 0) |

Parameters in the CLC_Request field are as follows:
Flag:
  b00: Type I CLC class;
  b01: Type II CLC class subtype 1;
  b10: Type II CLC class subtype 2 or 3; and
  b11: Type III CLC class.
Scheduling Impact:
  0b00 (default)=both DL and UL allocations are prohibited in CLC Active Interval;
  0b01=only DL allocations are prohibited in CLC Active Interval;
  0b10=only UL allocations are prohibited in CLC Active Interval; and
  0b11=reserved.

CLC active interval of Type I CLC class:
  The number of subframes of the CLC Active Interval for Type I CLC class.
CLC active cycle of Type I CLC class:
  The number of microseconds of the CLC Active Cycle for Type I CLC class.
CLC active interval of Type II CLC class with subtype 1:
  The number of subframes of the CLC Active Interval for Type II CLC class.
CLC active cycle of Type II CLC class with subtype 1:
  The number of frames of the CLC Active Cycle for Type II CLC class.
Extended CLC Active Bitmap Indicator:
  Indicate whether the Extended CLC Active Bitmap field is used.
CLC Active Bitmap:
  Setting a bit of the field to "1" indicating that the corresponding subframe in each frame is in a CLC active interval.
Extended CLC Active Bitmap:
  Setting a bit of the field to "1" indicating that the corresponding subframe in each CLC active cycle is in a CLC active interval.
CLC Active Interval of Type III CLC class:
  The number of superframes of the CLC Active Interval for Type III CLC class.

Figure 17:
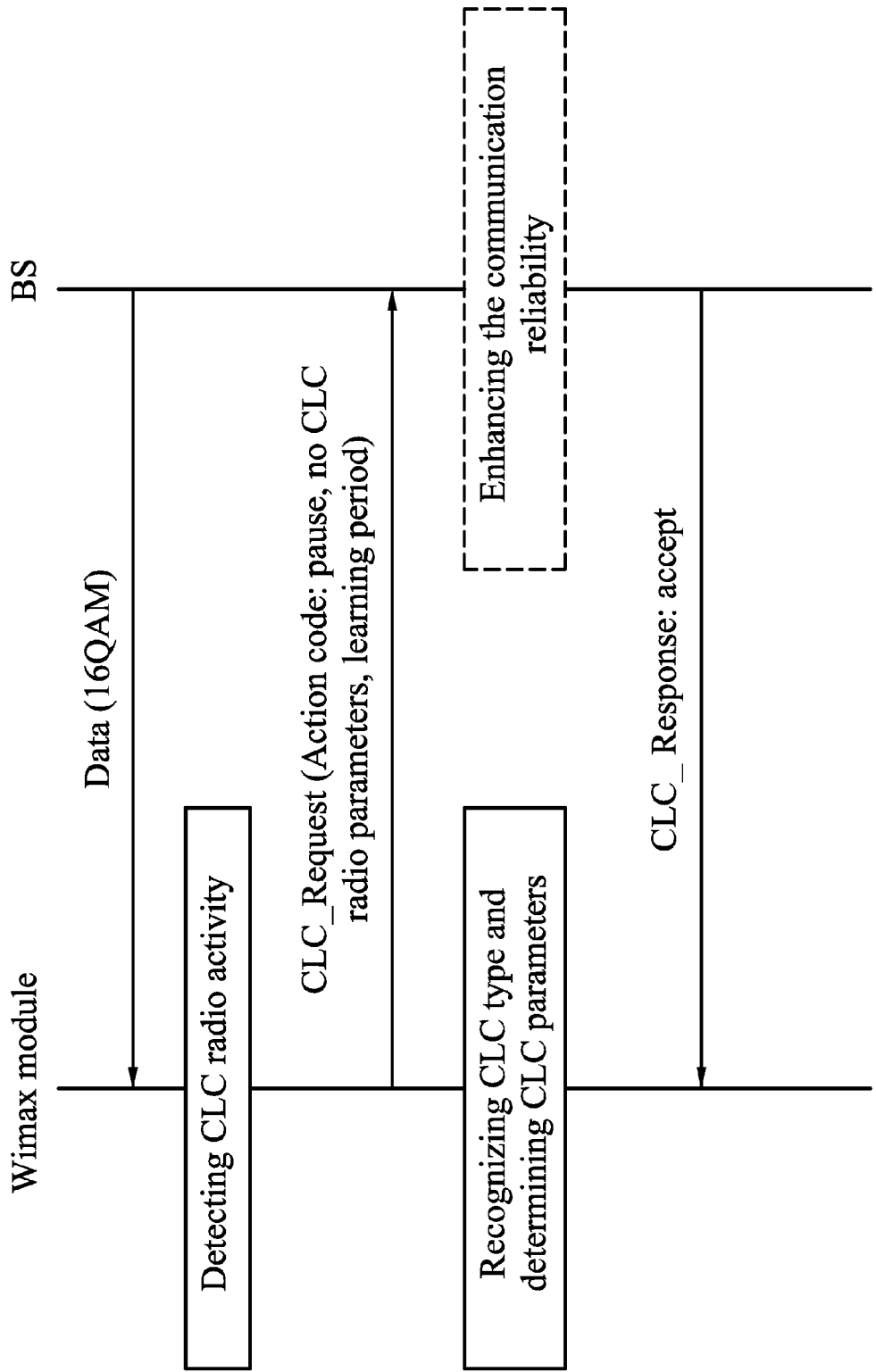
FIG. 17 is a interaction diagram showing the message flow of the CLC request in a learning phase according to an embodiment of the invention.

According to an embodiment of the invention, the WiMAX module may send the CLC_request with a CLC class set to Type III to the serving BS to request a long time period of absence for supporting the learning phase. The CLC class may be specified by the Flag field as illustrated above. According to another embodiment of the invention, the WiMAX module may also send a CLC_request to the serving BS to directly request a learning period for supporting the learning phase. FIG. 17 is an interaction diagram showing the message flow of the CLC request in a learning phase according to an embodiment of the invention. After detecting the CLC radio activity, the WiMAX module 102 may send a CLC_request with no CLC parameters to the serving BS to request a learning period. During the learning period, the radio resource of the mobile electronic device 100 is preferably reserved for the activating CLC radio module to obtain its radio characteristics. According to the embodiment of the invention, it is preferable to avoid data transmission between the serving BS and the WiMAX module 102 during this period. However, if it is necessary for the serving BS to transmit data to the WiMAX module 102, the serving BS may enhance the communications reliability. According to the embodiments of the invention, the serving BS may use a more robust downlink modulation and coding scheme (MCS), increase downlink burst transmission power, allow more retransmission using ARQ or HARQ in both downlink and uplink, and so on. As an example, the serving BS may use a more robust downlink MCS by decreasing the MCS order such as using the QPSK instead of a previous 16-QAM for data or (sub-) MAP modulation, or decreasing the code rate, or others. If the CLC radio module is unable to obtain all of the corresponding radio characteristics within this period almost time-out, the WiMAX module 102 may send another CLC_Request to start another learning phase or extend the learning phase. The serving BS may also respond to the WiMAX module 102 with a CLC response message comprising an acknowledgement of extending the learning phase or a rejection corresponding to the request. After obtaining the radio characteristics of the activated CLC radio module, the WiMAX module 102 and/or the CLC radio manager 104 may accordingly determine the CLC type and CLC parameters corresponding to the CLC radio module.

Figure 18:
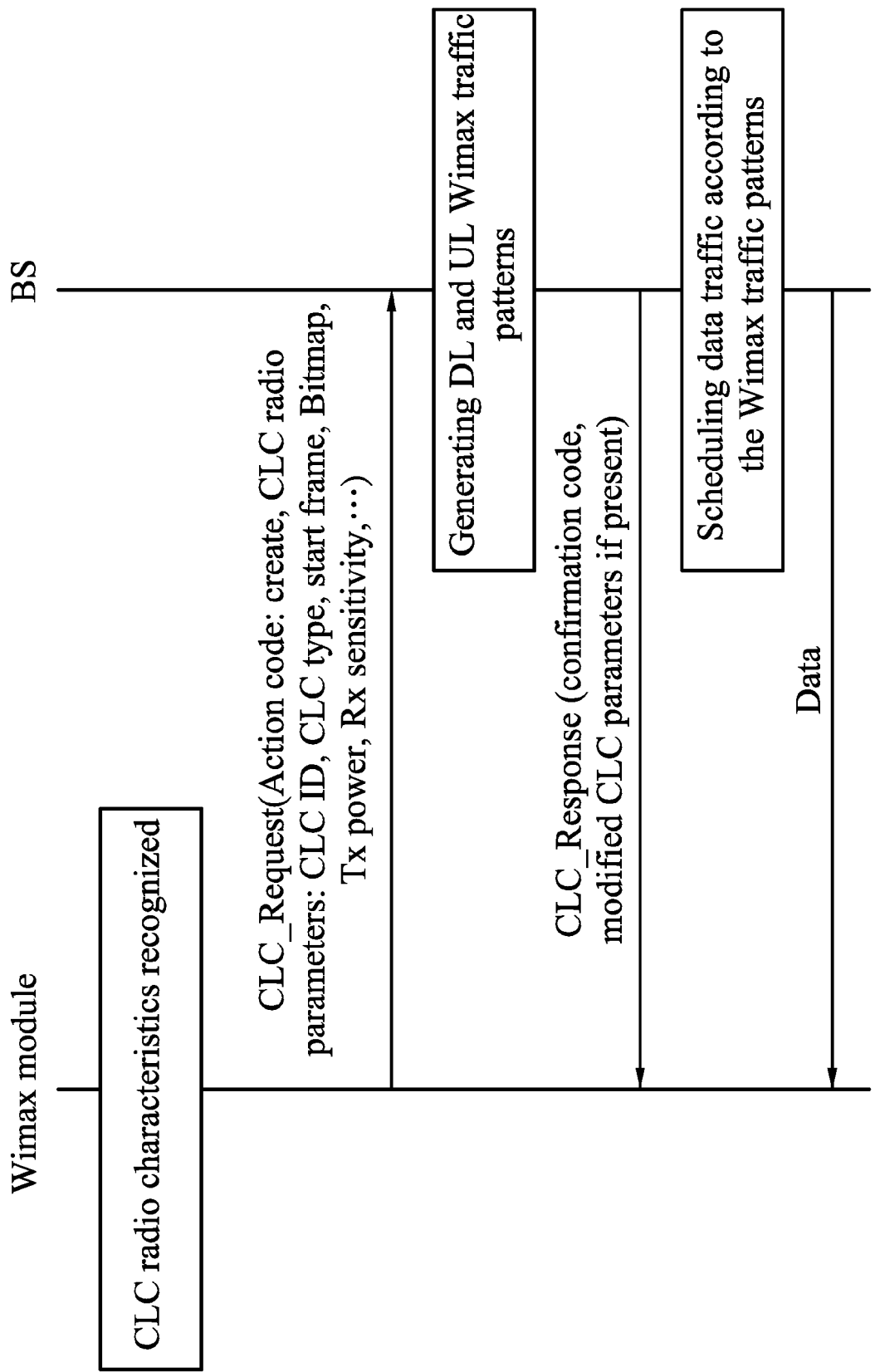
FIG. 18 is a interaction diagram showing the message flow of the CLC request in a negotiation phase according to an embodiment of the invention.

After obtaining and recognizing the corresponding radio characteristics of the CLC radio module, a negotiation phase may be entered by the WiMAX module 102 to describe the obtained CLC radio activity pattern and deliver to the serving BS. The CLC radio activity pattern may comprise parameters to describe the CLC radio activity obtained in the learning phase or obtained from the pre-defined configurations. The CLC radio activity may refer to the description of FIGS. 6, 8, 10 and 11. As an example, the CLC radio activity pattern of the activated CLC radio module may comprise information regarding the transmission power, receiving sensitivity, start time, time duration, transceiving type or others. According to an embodiment of the invention, a traffic pattern of the WiMAX module 102 for the DL and UL data traffic scheduling may further be generated according to the obtained traffic pattern of the CLC radio module so as to coordinate operations of the CLC radio module and the WiMAX module 102. The generated traffic pattern may describe a plurality of recommended downlink and/or uplink traffic allocations for the WiMAX module 102. Therefore, one or more radio resources of the mobile electronic device 100 may be coordinated to avoid signal interference or transceiving conflict. In the negotiation phase, the WiMAX module 102 may request the serving BS for one or more periods of absences to support the operation of co-located non-802.16 radios according to the generated traffic pattern. According to an embodiment of the invention, the WiMAX module 102 may send a CLC_Request with the generated traffic pattern for certain CLC class of the WiMAX module 102 to the serving BS. FIG. 18 is an interaction diagram showing the message flow of the CLC request in a negotiation phase according to an embodiment of the invention. For details of the CLC_Request message parameters, reference may be made to Table 3 and Table 4 and the corresponding paragraphs.

As previously described, in the embodiments of invention, the generated traffic pattern may have a finer resolution of up to a sub-frame time unit so as to improve time and/or spectrum efficiency. The methods to describe the traffic pattern may comprise a bitmap, a coexistence ratio, active and inactive windows, a real-time (fast) feedback, or others. The bitmap is a bit sequence comprising a plurality of bit information so as to use different logic levels of the bits to describe the traffic pattern. As an example, when the bit is set to a first logic level, it means that the BS is recommended to not serve the WiMAX module 102 during the corresponding time interval because the CLC radio module may have radio activity during this time interval. When the bit is set to a second logic level, it means that the BS is free to allocate downlink or uplink traffic for the WiMAX module 102 during the corresponding time interval. As an example, the CLC radio traffic pattern may be a sub-frame bitmap (for a Type II CLC class) to describe the traffic pattern of each sub-frame by one bit. A first logic level of the bit in the sub-frame bitmap indicates that the BS is recommended to not allocate downlink or uplink traffic for the WiMAX module 102 during the corresponding sub-frame time interval, and a second logic level of the bit indicates that the BS is free to allocate downlink or uplink traffic for the WiMAX module 102 during the corresponding sub-frame time interval. Therefore, a 1 byte of bitmap may comprise the traffic information of one frame, wherein each bit is used to describe one sub-frame. As another example, it is also possible to use two bitmaps to describe DL traffic pattern and UL traffic pattern respectively. As another example, it is also possible to describe the traffic pattern of each frame by one bit information. Therefore, 4 bits in a bitmap may be used to describe the traffic information of one super-frame. The coexistence ratio uses percentages to mean the reserved time for the CLC radio module. As an example, a 30% coexistence ratio may represent that the BS is recommended to ensure that 30% of the time for a predetermined time interval is preferably reserved for the CLC radio activity. The coexistence ratio may be suitable for the CLC radio activity without periodicity. The active window and inactive window may specify the start super-frame, frame, or sub-frame number, and the active and the inactive durations of a CLC radio activity. The window may use the millisecond, super-frame, frame or sub-frame time units according to the CLC types. The real-time (fast) feedback is a feedback channel or dedicated UL resource assigned by the serving BS to allow the WiMAX module 102 to report its radio resource preference in subsequent frames. The real-time (fast) feedback is suitable for a CLC radio with dynamic traffic pattern.

After receiving the CLC radio activity pattern, the serving BS may respond to the WiMAX module 102 with a confirmation code with a CLC_Response message to indicate whether the CLC_Request has been accepted. The serving BS may further determine whether to modify the CLC parameters if required or update the CLC radio activity pattern when the loading of the BS has changed. Based on the received CLC radio activity pattern, the serving BS may schedule the downlink and uplink WiMAX traffic allocations according to the recommended traffic pattern of the WiMAX module 102 obtained from the CLC_request message. The scheduled downlink and uplink WiMAX traffic allocations may be specified in the corresponding downlink and uplink MAP (DL_MAP ad UL_MAP) messages that are periodically broadcasted by the serving BS. Based on the recognition of CLC radio activity pattern, subsequent data transmissions and receptions of the WiMAX module and the CLC radio module may be staggered to avoid transmission conflict.

Figure 19:
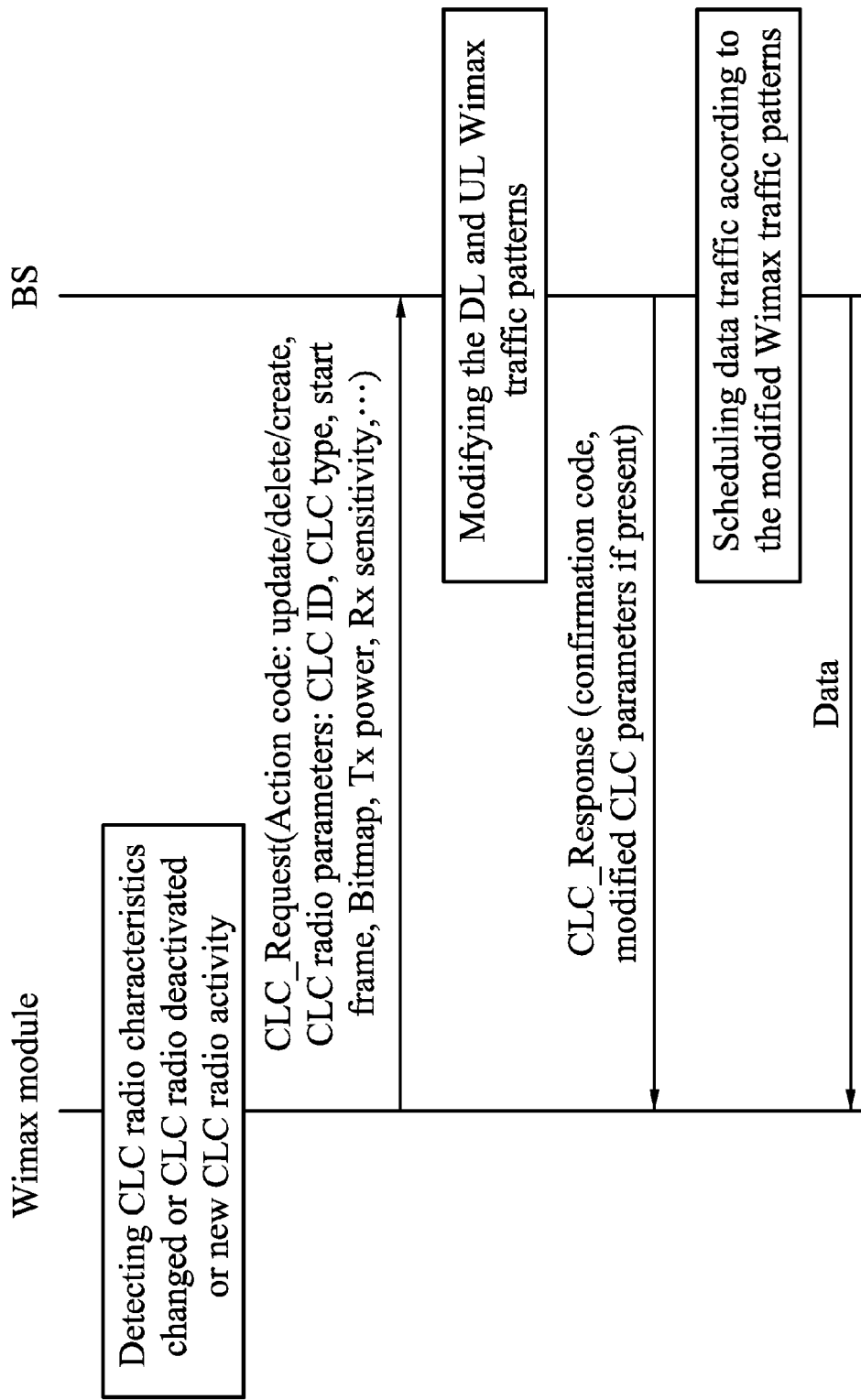
FIG. 19 is a interaction diagram showing the message flow of the CLC request to update/delete/create CLC parameters according to an embodiment of the invention.

According to an embodiment of the invention, the WiMAX module 102 may further update the CLC parameters when the communications status or the radio characteristics of the activated CLC radio module have changed, for example, the WLAN module enters or leaves the PS mode, the Bluetooth device establishes or releases a SCO, eSCO or ACL link, or others. FIG. 19 is a interaction diagram showing the message flow of the CLC request to update/delete/create CLC parameters according to an embodiment of the invention. When the CLC radio characteristics have changed, or the CLC radio has deactivated, or a new CLC radio activity is detected, the WiMAX module 102 may transmit the CLC_Request to update the CLC parameters, delete a previous CLC request, or create a new CLC request. The serving BS may modify the DL and UL WiMAX traffic allocations upon reception of the CLC_Request, and respond to the WiMAX module 102 with a confirmation code with a CLC_Response message to indicate whether the CLC_Request has been accepted via air interface. Afterward, the serving BS may schedule the WiMAX data traffic according to the modified downlink and uplink WiMAX traffic patterns.

According to the embodiments of the invention, the radio module may comprise a Traffic Pattern Generator (TPG) to generate a corresponding traffic pattern and the CLC radio manager 104 may comprise a Synchronization Information Generator (SIG) to coordinate between the traffic patterns obtained from different radio modules. As shown in FIG. 1, the IEEE 802.11 radio module 101 may comprise a TPG 301, the IEEE 802.16 radio module 102 may comprise a TPG 302, the IEEE 802.15.1 radio module 103 may comprise a TPG 303, and the CLC radio manager 104 may comprise the SIG 304. The SIG 304 may coordinate the traffic patterns of different radio modules according to reference clock(s), synchronized with the serving BS, and received from the IEEE 802.16 radio module 102. As an example, the TPG 303 may generate a Bluetooth HV3 traffic pattern according to the radio characteristic obtained in the learning phase and transmit the Bluetooth HV3 traffic pattern to the SIG 304. As previously illustrated, the methods to describe the traffic pattern may comprise a bitmap, a coexistence ratio, active and inactive windows, a real-time (fast) feedback, or others. As an example, the TPG 301 may describe the Bluetooth HV3 traffic pattern by {150 μs,625 μs,3750 μs}, wherein the first parameter represents a beginning time of the HV3 traffic, the second parameter represents a length of the HV3 traffic, and the third parameter represents a repeating cycle of the HV3 traffic. That is, information carried by the Bluetooth HV3 traffic pattern may indicate that the HV3 traffic having a length of 625 μs may start after 150 μs and the HV3 traffic will be repeated every 3750 μs. As an example, the TPG 303 may output the HV3 radio activities by 150 μs earlier than the start of the HV3 traffic. The SIG 304 may further receive the original DL_MAP and UL_MAP, a frame clock and a sub-frame clock from the WiMAX module 102 and generate a WiMAX traffic pattern describing the recommended downlink and/or uplink traffic allocations according to the HV3 traffic pattern, the original DL_MAP and UL_MAP.

Figure 20:
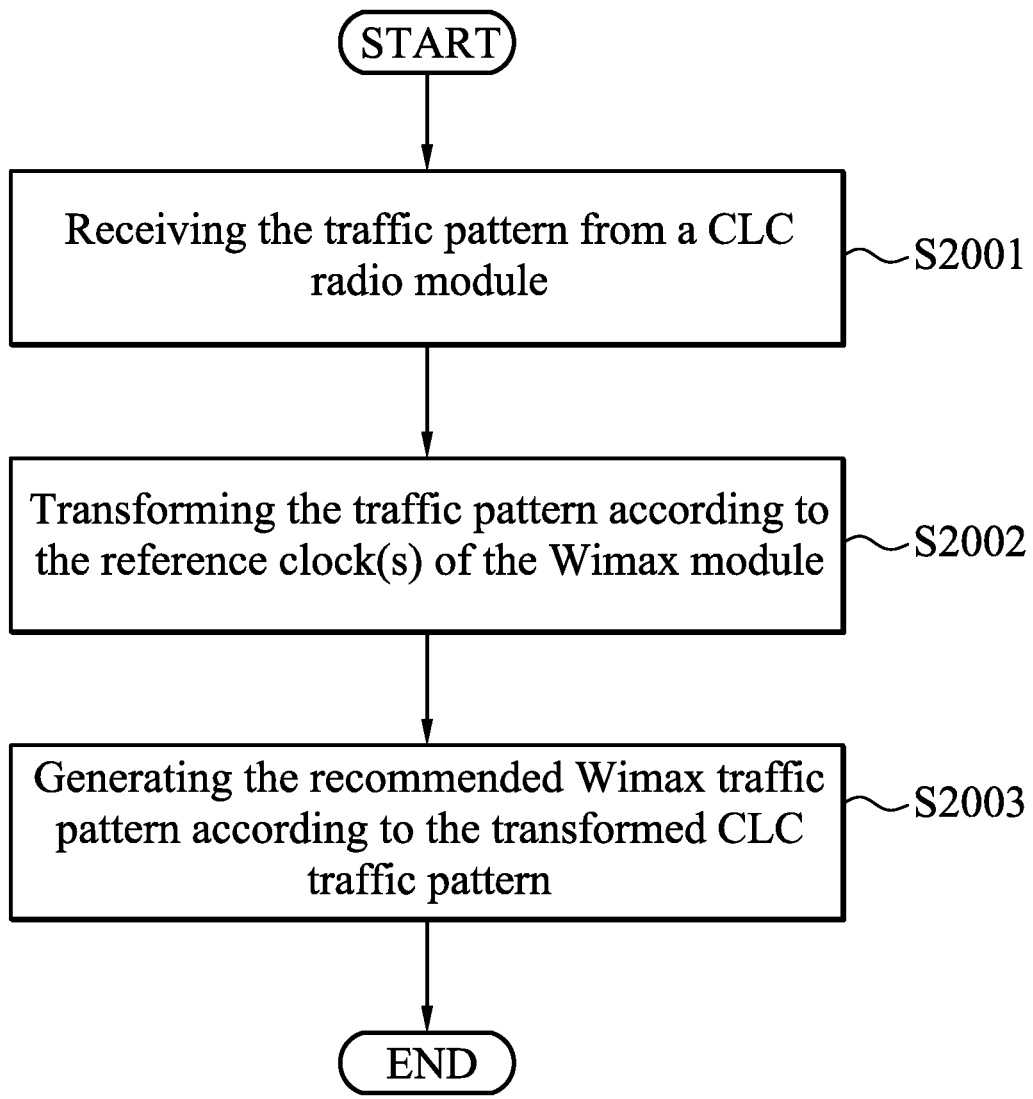
FIG. 20 is a flow chart showing a method for generating the WiMAX traffic pattern according to an embodiment of the invention.

FIG. 20 is a flow chart showing a method for generating the recommended WiMAX traffic pattern according to an embodiment of the invention. After receiving the traffic pattern from a CLC radio module (Step S2001), the SIG 304 transforms the traffic pattern according to the reference clock(s) of the WiMAX module 102 (Step S2002). As an example, the SIG 304 may transform the CLC traffic pattern according to the frame clock and/or sub-frame clock of the WiMAX module 102 so as to characterize the CLC traffic pattern in the WiMAX frame or sub-frame time unit. Note that since the CLC radio module may use the reference clock(s) with timing characteristics different from that of the WiMAX module 102, the transformation in Step 2002 may be required for the SIG 304 to transform the traffic pattern characterized by the CLC radio module timing into the CLC traffic pattern described by the WiMAX timing. Finally, the SIG 304 generates the recommended WiMAX traffic pattern according to the transformed CLC traffic pattern (Step S2003). It is noted that in the embodiments of the invention, the CLC radio manager 104 may be implemented by a software/firmware module. However, in order for accurate timing, some functions of the CLC radio manager 104, such as the SIG 304, may also be implement by a hardware device to have a fast response and the invention should not be limited thereto. In addition, the SIG 304 or the CLC radio manager 104 may also be implemented inside of the WiMAX module 102. Therefore, in some embodiments of the invention, the WiMAX module 102 or the TPG 302 may also receive the CLC traffic pattern, transform the CLC traffic pattern, and accordingly generate the recommended WiMAX traffic pattern, and the invention should not be limited thereto.

Figure 21:
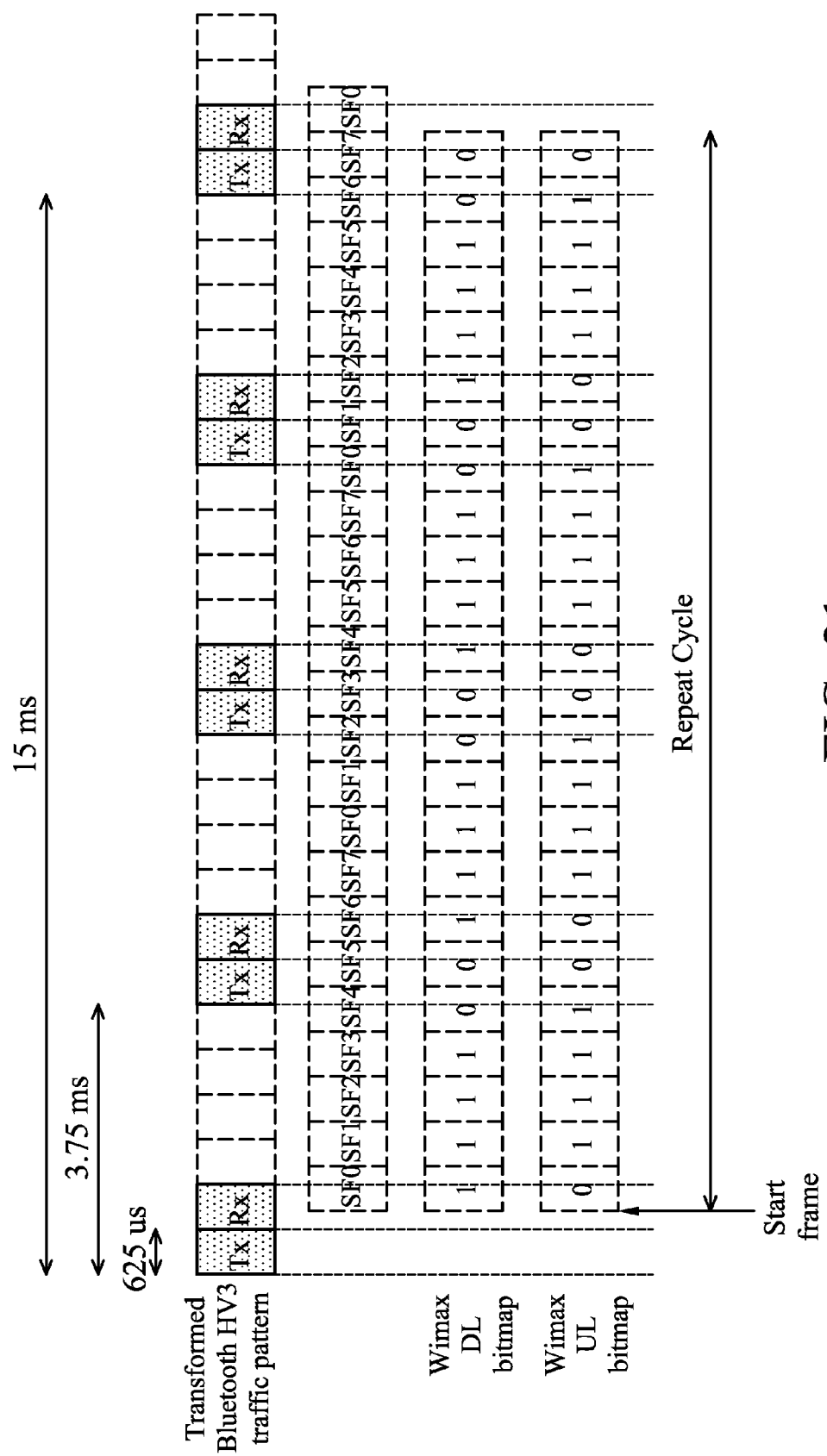
FIG. 21 shows schematic traffic patterns according to an embodiment of the invention.
Figure 22:
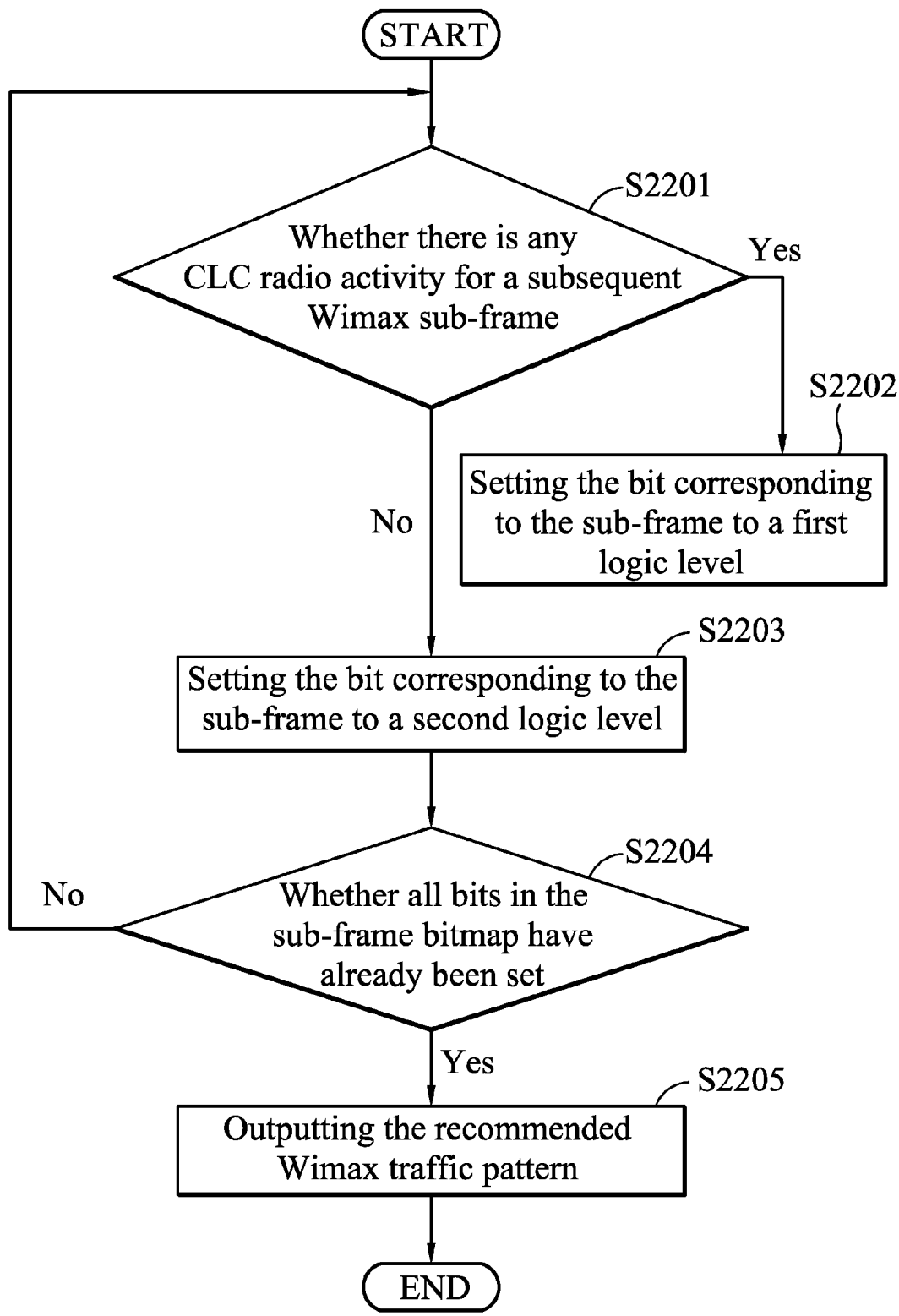
FIG. 22 is a flow chart showing a method for generating the sub-frame bitmap according to an embodiment of the invention.

FIG. 21 shows schematic traffic patterns according to an embodiment of the invention. In this embodiment, the CLC traffic is the Bluetooth HV3 traffic and the WiMAX traffic pattern is described by a sub-frame bitmap. FIG. 22 is a flow chart showing a method for generating the sub-frame bitmap according to an embodiment of the invention. After transforming the CLC traffic pattern according to the frame clock and the sub-frame clock of the WiMAX module 102, the SIG 304 or the WiMAX module 102 determines whether there is any CLC radio activity for a subsequent WiMAX sub-frame according to the transformed CLC traffic pattern (Step S2201). When there is any CLC radio activity in the corresponding subsequent sub-frames exist, the bit corresponding to the sub-frame is set to a first logic level (Step S2202). As an example, a logic '0' is set to mean that the BS is recommended to not allocate downlink or uplink traffic for the WiMAX module 102 during the corresponding sub-frame time interval. When there is no CLC radio activity in a corresponding subsequent sub-frame, the bit corresponding to the sub-frame is set to a second logic level (Step S2203). As an example, a logic '1' is set to mean that the BS is free to allocate downlink or uplink traffic for the WiMAX module 102 during the corresponding sub-frame time interval. Next, the SIG 304 or the WiMAX module 102 further determines whether all bits in the sub-frame bitmap have already been set (Step S2204). When all bits of the sub-frame bitmap have already been set, the SIG 304 or the WiMAX module 102 may output the recommended WiMAX traffic pattern (Step S2205). If not, the process goes back to Step S2201. According to an embodiment of the invention, a length of the sub-frame/frame bitmap may be decided according to a least common multiple (LCM) of the CLC radio traffic repeating cycle length and the WiMAX sub-frame/frame interval. As the example of a Bluetooth HV3 traffic pattern {150 µs,625 µs,3750 µs}, the length of a sub-frame bitmap may be obtained by LCM(3750, 5000)/5000=3 bytes. Therefore, the SIG 304 or the WiMAX module 102 may generate a sub-frame bitmap with a length of 3 bytes to describe the recommended WiMAX traffic pattern of 3 frames (i.e. 24 sub-frames), and the sub-frame bitmap may be reused for every 3 frames.

Figure 23:
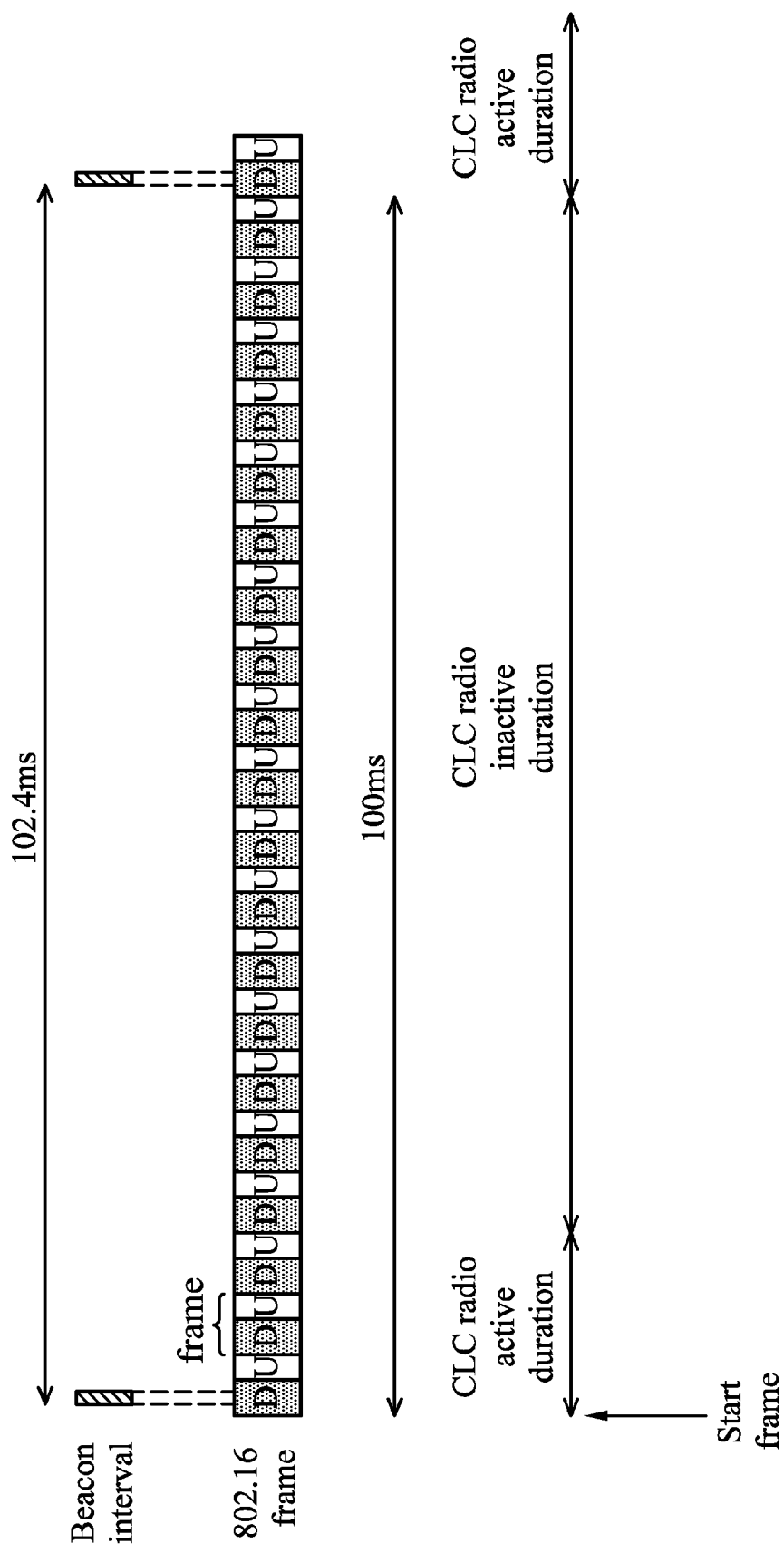
FIG. 23 shows schematic traffic patterns according to an embodiment of the invention.
Figure 24:
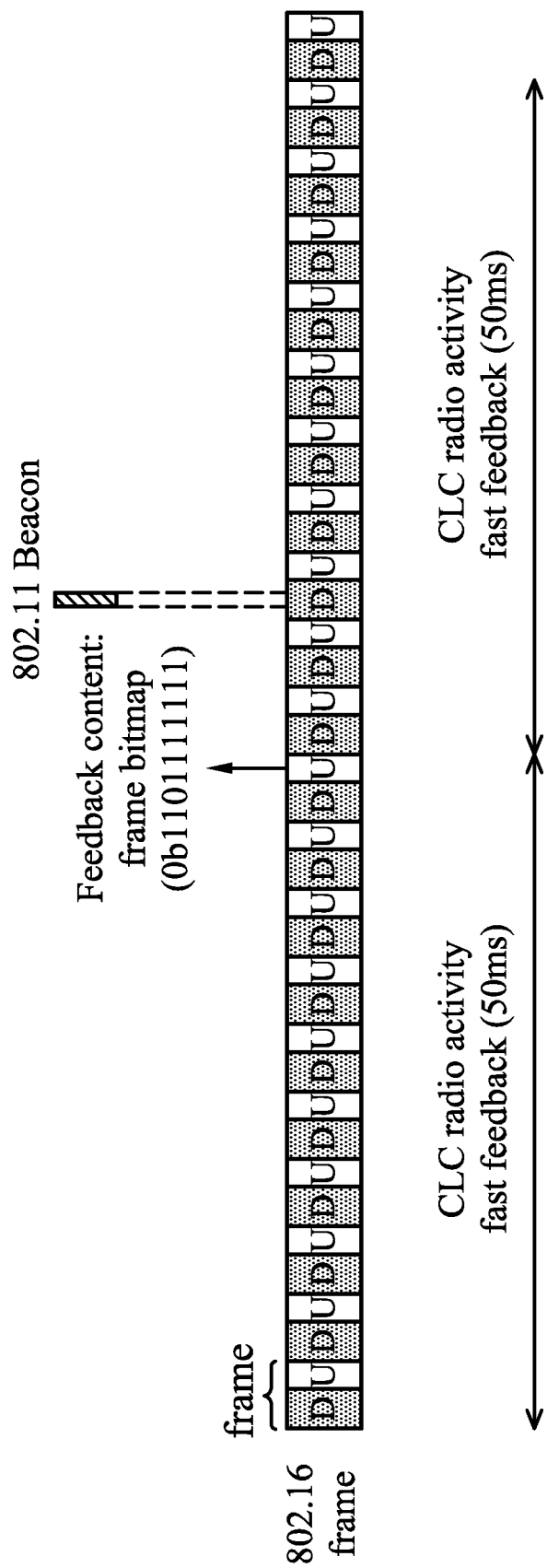
FIG. 24 shows schematic traffic patterns according to another embodiment of the invention.

FIG. 23 shows schematic traffic patterns according to an embodiment of the invention. In the embodiment of invention, active and inactive windows are used to describe the Beacon frame interval of the WLAN module 101. The repeating cycle of the Beacon frames is 102.4 ms. When an 802.16 frame falls in the CLC active window, the BS is recommended to not allocate downlink or uplink traffic during the frame time interval for the WiMAX module 102. When an 802.16 frame falls in the CLC inactive window, the BS is free to allocate downlink or uplink traffic during the frame time interval for the WiMAX module 102. FIG. 24 shows schematic traffic patterns according to another embodiment of the invention. In the embodiment of invention, real-time (fast) feedback is used to describe the Beacon frame interval of the WLAN module 101. The real-time (fast) feedback carries a frame bitmap to indicate the CLC radio activity of the 802.11 Beacon. In the embodiment, a logic '0' in the bitmap is used to indicate that the BS is recommended to not allocate downlink or uplink traffic for the WiMAX module 102 during the corresponding frame time interval because there is an incoming Beacon, and a logic '1' in the bitmap is used to indicate that the BS is free to allocate downlink or uplink traffic for the WiMAX module 102 during the corresponding frame time interval.

According to an embodiment of the invention, after the recommended WiMAX traffic pattern (such as the WiMAX DL/UL sub-frame bitmap shown in FIG. 21, the active/inactive windows shown in FIG. 23, or the real-time (fast) feedback shown in FIG. 24) is generated, the CLC radio manager 104 may generate management messages carrying the recommended WiMAX traffic pattern to a multi-radio coexistence processing module (such as the multi-radio coexistence functional block 1419 shown in FIG. 14) to respond with the corresponding actions to support multi-radio coexistence operations. Note that the WiMAX module 102 may also directly generate the recommended WiMAX traffic pattern as previously described and the invention should not be limited thereto. Next, the multi-radio coexistence processing module of the WiMAX module 102 generates the CLC_Request to characterize the obtained traffic pattern to the serving BS in the negotiation phase as previously described. Note that for the Frequency Division Duplex (FDD) WiMAX, two traffic patterns (i.e. the DL and UL traffic patterns) are required, while for the Time Division Duplex (TDD) WiMAX, the DL and UL traffic patterns may be respectively transmitted to the serving BS, or may be merged into one traffic pattern before being transmitted to the serving BS. After the serving BS receives the traffic pattern, the Scheduling and Resource Multiplexing block 1418 of the serving BS accordingly schedules the DL and UL traffic, and the Control Signaling block 1415 of the serving BS generates a new DL_MAP and UL_MAP according to the scheduling result. After the WiMAX module 102 receives the new DL_MAP and UL_MAP generated by the serving BS, the WiMAX module 102 may allocate the DL and UL traffic to receive or transmit data frames from or to the serving BS accordingly. According to the embodiments of the invention, since the new DL_MAP and UL_MAP are generated according to the recommended WiMAX traffic pattern being generated corresponding to the radio activity of the IEEE 802.16 radio module and the radio activity of the co-located non-802.16 radio module, the DL and UL traffic allocations based on the newly received DL_MAP and UL_MAP are well-coordinated and transmission and reception conflicts are therefore avoided. However, if it is necessary for the serving BS to transmit data to the WiMAX module 102 when any CLC activity exists the serving BS may enhance the communications reliability as previously described. For example, the serving BS may use a more robust downlink MCS, increase downlink burst transmission power, allow more retransmission using ARQ or HARQ in both downlink and uplink traffic, and so on.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
a first radio module providing a first wireless communications service and communicating with a first communications device in compliance with a first protocol; and
a second radio module providing a second wireless communications service and communicating with a second communications device in compliance with a second protocol, entering a learning phase, transmitting a first request message to the second communications device to request for a period of absence to support an initial setup or connection setup operation of the first radio module, detecting activities of the first radio module, obtaining a first traffic pattern describing traffic allocations of the first radio module, and after the learning phase, generating a second traffic pattern of the second radio module according to the first traffic pattern to coordinate operations of the first and second radio modules, and transmitting a second request message carrying the second traffic pattern to the second communications device, wherein the second traffic pattern describes recommended traffic allocations to a plurality of sub-frames for the second radio module, and each sub-frame defined by the second protocol comprises a plurality of Orthogonal Frequency Division Multiplexing (OFDM) symbols.

2. The communications apparatus as claimed in claim 1, wherein the second radio module further identifies a plurality of radio characteristics of the first radio module during the learning phase, and the radio characteristics comprise a transmission power, reception sensitivity, and the first traffic pattern describing downlink and/or uplink traffic allocations of the first radio module obtained from the first radio module.

3. The communications apparatus as claimed in claim 1, wherein the second communications device further enhances transmission reliability when transmitting data to the second radio module during the learning phase.

4. The communications apparatus as claimed in claim 3, wherein the transmission reliability is enhanced by using a more robust downlink modulation and coding scheme (MCS) than previously used MCS.

5. The communications apparatus as claimed in claim 3, wherein the transmission reliability is enhanced by increasing downlink burst transmission power.

6. The communications apparatus as claimed in claim 3, wherein the transmission reliability is enhanced by allowing retransmission for Automatic Repeat reQuest (ARQ) or Hybrid ARQ (HARQ) in both downlink and uplink traffic.

7. The communications apparatus as claimed in claim 1, wherein the second radio module further transmits a second request message to the second communications device to start another learning phase when the initial setup or connection setup operation of the first radio module does not complete and before the previously requested period is time-out.

8. The communications apparatus as claimed in claim 1, wherein the second radio module further receives a response message from the second communications device, comprising an acknowledgement of extending the learning phase or a rejection of the request.

9. The communications apparatus as claimed in claim 1, wherein the second radio module enters the learning phase when the first radio module performs an inquiry procedure to discover nearby devices or a page procedure to establish a link between the first radio module and the first wireless communications service.

10. The communications apparatus as claimed in claim 1, wherein the second radio module enters the learning phase when the first radio module performs an access process to attempt to associate with an access point (AP).

11. The communications apparatus as claimed in claim 1, wherein the second radio module enters the learning phase when the first radio module turns on, off or down.

12. The communications apparatus as claimed in claim 1, wherein the second radio module enters the learning phase when the first radio module changes between different communications modes.

13. The communications apparatus as claimed in claim 1, wherein the second traffic pattern is a sub-frame bitmap describing recommended traffic allocations for the sub-frames by a bit sequence.

14. The communications apparatus as claimed in claim 13, wherein each bit of the sub-frame bitmap set to a first logic level indicates that the second communications device is recommended to not allocate traffic for the second radio module during the corresponding sub-frame, and each bit of the sub-frame bitmap set to a second logic level indicates that the second communications device is free to allocate traffic for the second radio module during the corresponding sub-frame.

15. The communications apparatus as claimed in claim 1, wherein the first request message has the same message format as that of the second request message.

16. A method for coordinating operations of a first radio module, providing a first wireless communications service and communicating with a first communications device in compliance with a first protocol, and a second radio module, providing a second wireless communications service and communicating with a second communications device in compliance with a second protocol, comprised in a communications apparatus comprising:
  entering a learning phase for the second radio module;
  transmitting a first request message to the second communications device to request for a period of absence to support an initial setup or connection setup operation of the first radio module;
  detecting activities of the first radio module;
  obtaining a first traffic pattern describing traffic allocations of the first radio module;
  after the learning phase, generating a second traffic pattern of the second radio module according to the first traffic pattern to coordinate operations of the first and second radio modules; and
  transmitting a second request message carrying the second traffic pattern to the second communications device,
  wherein the second traffic pattern describes recommended traffic allocations to a plurality of sub-frames for the second radio module, and each sub-frame defined by the second protocol comprises a plurality of Orthogonal Frequency Division Multiplexing (OFDM) symbols.

17. The method as claimed in claim 16, further comprising:
  identifying a plurality of radio characteristics of the first radio module during the learning phase, wherein the radio characteristics comprise a transmission power, reception sensitivity, and the first traffic pattern describing downlink and/or uplink traffic allocations of the first radio module obtained from the first radio module.

18. The method as claimed in claim 16, further comprising:
  enhancing transmission reliability when transmitting data to the second radio module during the learning phase.

19. The method as claimed in claim 18, wherein the transmission reliability is enhanced by using a more robust downlink modulation and coding scheme (MCS) than previously used MCS.

20. The method as claimed in claim 18, wherein the transmission reliability is enhanced by increasing downlink burst transmission power.

21. The method as claimed in claim 18, wherein the transmission reliability is enhanced by allowing retransmission for Automatic Repeat reQuest (ARQ) or Hybrid ARQ (HARQ) in both downlink and uplink traffic.

22. The method as claimed in claim 16, further comprising:
  transmitting a second request message to the second communications device to start another learning phase when the initial setup or connection setup operation of the first radio module does not complete and before the previously requested period is time-out.

23. The method as claimed in claim 16, further comprising:
  receiving a response message comprising an acknowledgement of extending the learning phase or a rejection of the request from the second communications device.

24. The method as claimed in claim 16, wherein the learning phase is entered when the first radio module performs an inquiry procedure to discover nearby devices or a page procedure to establish a link between the first radio module and the first wireless communications service.

25. The method as claimed in claim 16, wherein the learning phase is entered when the first radio module performs an access process to attempt to associate with an access point (AP).

26. The method as claimed in claim 16, wherein the learning phase is entered when the first radio module turns on, off or down.

27. The method as claimed in claim 16, wherein the learning phase is entered when the first radio module changes between different communications modes.

28. The method as claimed in claim 16, wherein the second traffic pattern is a sub-frame bitmap describing recommended traffic allocations for the sub-frames by a bit sequence.

29. The method as claimed in claim 28, wherein each bit of the sub-frame bitmap set to a first logic level indicates that the second communications device is recommended to not allocate traffic for the second radio module during the corresponding sub-frame, and each bit of the sub-frame bitmap set to a second logic level indicates that the second communications device is free to allocate traffic for the second radio module during the corresponding sub-frame.

30. The method as claimed in claim 16, wherein the first request message has the same message format as that of the second request message.

\* \* \* \* \*